(12) United States Patent
Zhang et al.

(10) Patent No.: US 9,276,672 B2
(45) Date of Patent: Mar. 1, 2016

(54) METHOD, TRANSPORT APPARATUS, AND SYSTEM FOR DETECTING SUBMARINE OPTICAL CABLE LINE

(71) Applicant: Huawei Marine Networks Co., Ltd., Tianjin (CN)

(72) Inventors: Wendou Zhang, Beijing (CN); Liping Ma, Beijing (CN)

(73) Assignee: Huawei Marine Networks Co., Ltd., Tianjin (CN)

( * ) Notice: Subject to any disclaimer, the term of this patent is extended or adjusted under 35 U.S.C. 154(b) by 41 days.

(21) Appl. No.: 14/092,145

(22) Filed: Nov. 27, 2013

(65) Prior Publication Data

US 2014/0086573 A1    Mar. 27, 2014

Related U.S. Application Data

(63) Continuation of application No. PCT/CN2012/071485, filed on Feb. 23, 2012.

(30) Foreign Application Priority Data

May 27, 2011 (CN) .......................... 2011 1 0139715

(51) Int. Cl.
*H04B 10/00* (2013.01)
*H04B 10/077* (2013.01)
(Continued)

(52) U.S. Cl.
CPC .......... *H04B 10/0771* (2013.01); *H04B 10/071* (2013.01); *H04B 10/80* (2013.01)

(58) Field of Classification Search
USPC ...................................................... 398/1–38
See application file for complete search history.

(56) References Cited

U.S. PATENT DOCUMENTS

| 5,315,674 | A | * | 5/1994 | Asako | ............................. | 385/15 |
| 5,436,746 | A | * | 7/1995 | Hirst | ............................... | 398/37 |
| 5,481,390 | A | * | 1/1996 | Naito | ............................. | 398/180 |

(Continued)

FOREIGN PATENT DOCUMENTS

| CN | 101453273 A | 6/2009 |
| CN | 101552639 A | 10/2009 |

(Continued)

OTHER PUBLICATIONS

ITU-T, "Characteristics of optically amplified optical fibre submarine cable systems" Series G: Transmission Systems and Media, Digital Systems and Networks, G.977, Apr. 2011, 40 pages.

*Primary Examiner* — Agustin Bello
(74) *Attorney, Agent, or Firm* — Brinks Gilson & Lione

(57) ABSTRACT

A method for detecting a submarine optical cable line includes: splitting a detection signal input to a first optical functional unit in an optical functional module of an optical cable line into a first detection signal and a second detection signal; directly coupling and looping back the first detection signal to an output end of a second optical functional unit in a direction opposite to the first optical functional unit to constitute a first loopback path, and outputting a first detection loopback signal; looping back the second detection signal passing through the first optical functional unit to the output end of the second optical functional unit to constitute a second loopback path, and outputting a second detection loopback signal; and detecting a status of the submarine optical cable line according to power of the first detection loopback signal and power of the second detection loopback signal.

18 Claims, 11 Drawing Sheets

(51) Int. Cl.
  *H04B 10/80* (2013.01)
  *H04B 10/071* (2013.01)

(56) References Cited

U.S. PATENT DOCUMENTS

| | | | | |
|---|---|---|---|---|
| 5,500,756 | A  * | 3/1996  | Tsushima et al. | 398/181 |
| 5,737,105 | A  * | 4/1998  | Ohta et al. | 398/18 |
| 5,778,117 | A  * | 7/1998  | Inoue et al. | 385/24 |
| 5,790,294 | A  * | 8/1998  | Horiuchi et al. | 398/37 |
| 6,028,684 | A  * | 2/2000  | Kidorf | 398/20 |
| 6,134,032 | A  * | 10/2000 | Kram et al. | 398/17 |
| 6,259,554 | B1 * | 7/2001  | Shigematsu et al. | 359/337 |
| 6,301,404 | B1 * | 10/2001 | Yoneyama | 385/24 |
| 6,414,775 | B1 * | 7/2002  | Pedersen | 398/177 |
| 6,603,587 | B1 * | 8/2003  | Yokoyama et al. | 398/178 |
| 6,708,004 | B1   | 3/2004  | Homsey | |
| 7,068,945 | B2 * | 6/2006  | Ogiwara et al. | 398/173 |
| 7,509,055 | B2 * | 3/2009  | Tomofuji et al. | 398/160 |
| 7,676,160 | B2 * | 3/2010  | Ohta | 398/181 |
| 2002/0131696 | A1 * | 9/2002 | Yokoyama et al. | 385/27 |
| 2004/0096215 | A1 * | 5/2004 | Evangelides et al. | 398/33 |
| 2005/0259264 | A1 * | 11/2005 | Munehira et al. | 356/450 |
| 2009/0202237 | A1 * | 8/2009 | Zhang et al. | 398/6 |
| 2009/0324249 | A1 * | 12/2009 | Zhang | 398/177 |
| 2010/0027993 | A1 * | 2/2010 | Yamaguchi et al. | 398/25 |
| 2012/0106947 | A1   | 5/2012 | Wang et al. | |
| 2014/0086573 | A1 * | 3/2014 | Zhang et al. | 398/16 |

FOREIGN PATENT DOCUMENTS

| | | |
|---|---|---|
| CN | 101931471 A | 12/2010 |
| JP | S63175541 A | 7/1988 |

* cited by examiner

METHOD, TRANSPORT APPARATUS, AND SYSTEM FOR DETECTING SUBMARINE OPTICAL CABLE LINE

CROSS-REFERENCE TO RELATED APPLICATIONS

This application is a continuation of International Application No. PCT/CN2012/071485, filed on Feb. 23, 2012, which claims priority to Chinese Patent Application No. 201110139715.1, filed on May 27, 2011, both of which are hereby incorporated by reference in their entireties.

FIELD OF THE INVENTION

The present invention relates to the field of optical communication technologies, and in particular, to a method, a transport apparatus, and a system for detecting a submarine optical cable line.

BACKGROUND OF THE INVENTION

A submarine cable communication system bears large-capacity communication services between continents. Failures of submarine optical cables and devices have a huge impact on communication. An objective that the submarine cable system pursues constantly is to locate a failure point timely and precisely and accurately reflect a failure mode. A failure locating method based on an optical time-domain reflectometry (OTDR, Optical Time-Domain Reflectometry) technology gradually becomes a mainstream failure locating method of the submarine cable system. An optical repeater of the submarine cable communication system usually includes an optical isolator, and a backscattered loopback signal after the isolator cannot be returned. Therefore, in the submarine cable system, a loopback channel of an OTDR backscattered loopback signal is established in a device of an optical isolation area, thereby implementing line detecting of the repeater submarine cable system.

In a line detecting solution using the OTDR technology, usually an output-to-output loopback manner or an output-to-input loopback manner is used.

FIG. 1 is a schematic diagram of an output-to-output backscattered signal loopback detecting principle. A submarine cable line terminal device and a submarine cable line detecting device are arranged on the land, and a submarine cable line including an optical repeater and an optical cable is placed in the seafloor. The submarine cable line detecting device sends a detection signal to the submarine cable line through a coupler, where the detection signal passes through the submarine cable line and is returned to the submarine cable line detecting device through the coupler. The loopback manner in the optical repeater establishes a common backscattered loopback channel at the output ends of a pair of amplifiers in opposite directions. The downlink line of the loopback channel is from the output end of the downlink amplifier to the output end of the uplink amplifier; the uplink line of the loopback channel is from the output end of the uplink amplifier to the output end of the downlink amplifier. There are coupling apparatuses at the output ends of the downlink amplifier and uplink amplifier. In FIG. 1, when a breakpoint exists in the optical cable, the breakpoint may be known according to power of the backscattered loopback signal received by the submarine cable line detecting device.

The power of the backscattered loopback signal received by the submarine cable line detecting device has the following relationship:

$$P_{RX\_N} = P_{TX} + \sum_{1}^{N} G_i^{down} - \sum_{1}^{N-1} IL_i^{down} + B_s - IL_N^{loopback} + \sum_{1}^{N-1} G_i^{up} - \sum_{1}^{N-1} IL_i^{up} \quad \text{(Formula 1)}$$

$P_{RX\_N}$ indicates power of a detection signal which is returned from the $N^{th}$ span;

$P_{TX}$ indicates a detection signal generated by the line detecting device;

$G_i^{down}$ and $G_i^{up}$ respectively indicate gains of the downlink amplifier and uplink amplifier of the $i^{th}$ optical repeater;

$IL_i^{down}$ and $IL_i^{up}$ respectively indicate losses of fibers in the downlink path and uplink path in the $i^{th}$ span;

$B_s$ indicates a ratio of power of a backscattered loopback signal, is related to the fiber, and usually is a fixed value; and $IL_N^{loopback}$ indicates a loopback loss in the $N^{th}$ optical repeater.

If a submarine device is normal, an obtained detection curve is shown by the solid line in FIG. 2. In FIG. 2, the horizontal axis represents time, and the vertical axis represents power of the backscattered loopback signal. The power of the backscattered loopback signal changes with the time, as shown by the solid line in FIG. 2. Each span represents the change of the power of an optical repeater and an optical cable connected to the optical repeater.

To improve reliability, in two amplifiers in an optical repeater of a submarine cable, usually a pump redundancy manner is used. To be specific, forward and reverse optical amplifiers share a pair of pump lasers to provide energy. When one of the pump lasers fails, output power of the two amplifiers is reduced by 3 dB, and at the same time, gains are also reduced by 3 dB. This means that input power of the next optical repeater is also reduced by 3 dB. Because all optical repeaters in the line work in a deep saturated status, when the input power of the next repeater is reduced by 3 dB, a gain of the repeater is automatically increased by 3 dB. As may be known by analyzing the above features of the gain, when a pump fails, for example, a pump in the second optical repeater fails, the change of the detection curve is shown by the dotted line in FIG. 2, which shows that the detection curves of the second and third spans are lowered slightly. The detection curve cannot reflect changes of the gain and output power of the optical repeater in the line, and it is difficult to identify a pump failure event.

In FIG. 3, the upper part includes three spans, and each span includes a first half-span optical cable and a second half-span optical cable. The span between optical repeaters is large. With the loopback manner, the status of only a part of the optical cable within the span can be detected, for example, the first half-span optical cable, while the detection curve of the second half span is covered by noise. The detection curve is shown by the wave part in the upper part of FIG. 3. In this case, if a breakpoint occurs in the second half-span optical cable or the next optical repeater fails, the detection curve is shown by the lower part of FIG. 3. The wave part in the lower part of FIG. 3 is similar to the wave part in the upper part of FIG. 3, and therefore, it is difficult to distinguish whether the cable is broken or the next optical repeater fails.

FIG. 4 is a schematic diagram of an output-to-input backscattered signal loopback detecting principle. In the loopback manner, two separate backscattered loopback channels are respectively established at the output ends and input ends of a pair of downlink and uplink amplifiers in opposite directions and in the optical repeater, which are used for detection in different directions. There are coupling apparatuses at the input end and output end of the downlink amplifier and the input end and output end of the uplink amplifier. The downlink line of the loopback channel is from the output end of the downlink amplifier to the input end of the uplink amplifier; the uplink line of the loopback channel is from the output end of the uplink amplifier to the input end of the downlink amplifier.

Power of a backscattered loopback signal received by the submarine cable line detecting device has the following relationship:

$$P_{RX\_N} = P_{TX} + \sum_{1}^{N} G_i^{down} - \sum_{1}^{N-1} IL_i^{down} + B_s - IL_N^{loopback} + \sum_{1}^{N-1} G_i^{up} - \sum_{1}^{N-1} IL_i^{up}$$ (Formula 2)

$P_{RX\_N}$ indicates power of a detection signal which is returned from the $N^{th}$ span;

$P_{TX}$ indicates a detection signal generated by the line detecting device;

$G_i^{down}$ and $G_i^{up}$ respectively indicate gains of the downlink amplifier and uplink amplifier of the $i^{th}$ optical repeater;

$IL_i^{down}$ and $IL_i^{up}$ respectively indicate losses of fibers in the downlink path and uplink path in the $i^{th}$ span;

$B_s$ indicates a ratio of power of a backscattered loopback signal, is related to the fiber, and usually is a fixed value; and $IL_N^{loopback}$ indicates a loopback loss in the $N^{th}$ optical repeater.

If a submarine device is normal, an obtained detection curve is shown by the solid line in FIG. 5. As shown by the dotted line in FIG. 5, when a pump in an optical repeater fails, for example, a pump in the second optical repeater from left to right in FIG. 4 fails, the detected power change is shown by the dotted line, which shows that the detection curve of the first span rises by 3 dB and that the detection curve of the second span is lowered by 3 dB. The detection curve cannot truly reflect changes of the gain and output power of each optical repeater in the line, and the pump failure event always needs to be analyzed and confirmed through the uplink and downlink bidirectional detection curves.

In an application scenario of long spans, a detection curve is shown in the upper part of FIG. 6. With the loopback manner, the status of only a part of an optical cable within a span can be detected, for example, the first half-span optical cable, while the detection curve of the second half span is covered by noise. The noise part is shown by the wave part in the upper part of FIG. 6. In this case, if a breakpoint occurs in the second half-span optical cable or the next optical repeater fails, the detection curve is shown in the lower part of FIG. 6, and the power detected in the second span is increased. The wave part in the lower part of FIG. 3 is similar to the wave part in the upper part of FIG. 3, but it is still difficult to distinguish the two failure modes.

The detection results of the above two manners show that: detecting the gain of light passing through all optical repeaters and the sum of losses of all optical cables can neither detect the gain of the amplifying unit of an optical repeater in one direction, nor detect validity of the pump of an optical repeater. Likewise, for a submarine optical functional module, for example, an optical equalizer or an optical splitter, failures cannot be located accurately, and as a result, a performance detecting and failure locating cannot be performed for the submarine device accurately.

At present, a dynamic range of the commercial coherent OTDR meter in the submarine cable field is about 17 dB, and the corresponding span line-of-sight distance of the optical cable is about 85 km. With the development of submarine cable transmission technologies, the span distance of the submarine cable in some areas is increased from 70 km to more than 100 km and even to 120-150 km, and the coherent OTDR detection capability already cannot satisfy the requirement for accurately locating a long-span system failure.

SUMMARY OF THE INVENTION

An embodiment of the present invention provides a method for detecting a submarine optical cable line, where a status of an optical cable can be detected, and a failure mode beyond the line of sight of a backscattered signal in scenarios of long spans can also be clearly distinguished.

An embodiment of the present invention also provides a transport apparatus for detecting a submarine optical cable line, where the apparatus can support detecting of a status of an optical cable, and can also clearly distinguish a failure mode beyond the line of sight of a backscattered signal in scenarios of long spans.

An embodiment of the present invention also provides a system for detecting a submarine optical cable line, where the system can support detecting of a status of an optical cable, and can also clearly distinguish a failure mode beyond the line of sight of a backscattered signal in scenarios of long spans.

A method for detecting a submarine optical cable line includes: during line detecting, splitting a detection signal input to a first optical functional unit in an optical functional module of an optical cable line into a first detection signal and a second detection signal;

directly coupling and looping back the first detection signal to an output end of a second optical functional unit in a direction opposite to the first optical functional unit in the optical functional module to constitute a first loopback path, and outputting a first detection loopback signal at a trunk line;

looping back the second detection signal passing through the first optical functional unit to the output end of the second optical functional unit to constitute a second loopback path, and outputting a second detection loopback signal at the trunk line; and detecting a status of the submarine optical cable line according to power of the first detection loopback signal and power of the second detection loopback signal.

The looping back the second detection signal passing through the first optical functional unit to the output end of the second optical functional unit includes: feeding the second detection signal passing through the first optical functional unit into the trunk line, and coupling and looping back backscattered light generated in the optical cable to the output end of the second optical functional unit.

The looping back the second detection signal passing through the first optical functional unit to the output end of the second optical functional unit includes: reflecting a part of the second detection signal passing through the first optical functional unit, and looping back the reflected detection signal to the output end of the second optical functional unit.

The method further includes:

during line detecting, splitting a detection signal input to the first optical functional unit into a third detection signal and a fourth detection signal, and feeding the fourth detection signal to the trunk line after the fourth detection signal passes through the first optical functional unit;

directly coupling and looping back a first part of the third detection signal to the output end of the second optical functional unit, and outputting a third detection loopback signal at the trunk line; and coupling and inputting a second part of the third detection signal to an input end of the second optical functional unit, and outputting a fourth detection loopback signal at the trunk line after the second part of the third detection signal passes through the second optical functional unit.

The method further includes:

during line detecting, feeding the detection signal input to the first optical functional unit to the trunk line after the detection signal passes through the first optical functional unit, and coupling and looping back backscattered light generated in the trunk line to the input end of the second optical functional unit, and after the backscattered light passes through the second optical functional unit, outputting a fifth detection loopback signal at the trunk line; and determining a loss status of a fiber in the submarine optical cable according to a curve of power of the fifth detection loopback signal and return time of the power of the fifth detection loopback signal.

The detecting a status of the submarine optical cable line according to power of the first detection loopback signal and power of the second detection loopback signal includes: if the power of the first detection loopback signal and the power of the second detection loopback signal are both zero, determining that the trunk line fails; if the power of the first detection loopback signal is not zero and the power of the second detection loopback signal is zero, determining that the first optical functional unit fails; and if neither the power of the first detection loopback signal nor the power of the second detection loopback signal is zero, obtaining a gain or loss of the first optical functional unit according to the power of the first detection loopback signal and the power of the second detection loopback signal.

The method further includes:

during line detecting, if the power of the third detection loopback signal and the power of the fourth detection loopback signal are both zero, determining that the trunk line fails; if the power of the third detection loopback signal is not zero and the power of the fourth detection loopback signal is zero, determining that the second optical functional unit fails; and if neither the power of the third detection loopback signal nor the power of the fourth detection loopback signal is zero, obtaining a gain or loss of the second optical functional unit according to the power of the third detection loopback signal and the power of the fourth detection loopback signal.

The first optical functional unit is a downlink optical functional unit, and the detecting a status of the submarine optical cable line according to power of the first detection loopback signal and power of the second detection loopback signal includes: detecting a status of a downlink submarine optical cable line according to the power of the first detection loopback signal and the power of the second detection loopback signal; or the first optical functional unit is an uplink optical functional unit, and the detecting a status of the submarine optical cable line according to power of the first detection loopback signal and power of the second detection loopback signal includes: detecting a status of an uplink submarine optical cable line according to the power of the first detection loopback signal and the power of the second detection loopback signal.

The method further includes: filtering out-band noise light of the first detection loopback signal in the first loopback path, and/or filtering out-band noise light of the second detection loopback signal in the second loopback path.

A transport apparatus for detecting a submarine optical cable line includes a first optical functional unit and a second optical functional unit, and further includes: a first coupling apparatus connected to an input end of the first optical functional unit, a second coupling apparatus connected to an output end of the first optical functional unit, a fourth coupling apparatus connected to an input end of the second optical functional unit, a third coupling apparatus connected to an output end of the second optical functional unit, and a fifth coupling apparatus respectively connected to the first coupling apparatus, the second coupling apparatus, the third coupling apparatus, and the fourth coupling apparatus, where:

during downlink line detecting, a downlink detection signal input to the first coupling apparatus is split into a first downlink detection signal and a second downlink detection signal; the first downlink detection signal passes through the fifth coupling apparatus, and then a first downlink detection loopback signal is output from the third coupling apparatus and fed into an uplink trunk line; and the second downlink detection signal is input to the second coupling apparatus through the first optical functional unit, a detection signal output from the second coupling apparatus passes through the fifth coupling apparatus, and then a second downlink detection loopback signal is output from the third coupling apparatus and fed into the uplink trunk line; and during uplink line detecting, an uplink detection signal input to the fourth coupling apparatus is split into a first uplink detection signal and a second uplink detection signal; the first uplink detection signal passes through the fifth coupling apparatus, and then a first uplink detection loopback signal is output from the second coupling apparatus and fed into a downlink trunk line; and the second uplink detection signal is input to the third coupling apparatus through a second optical functional unit, a detection signal output from the third coupling apparatus passes through the fifth coupling apparatus, and then a second uplink detection loopback signal is output from the second coupling apparatus and fed into the downlink trunk line.

The second coupling apparatus includes a second coupler and a second reflector, and the third coupling apparatus includes a third coupler and a third reflector;

the second downlink detection signal is input to the second coupler through the first optical functional unit, and after being output from the second coupler, is reflected by the second reflector and input to the second coupler, a detection signal output from the second coupler passes through the fifth coupling apparatus, and then a second downlink detection loopback signal is output from the third coupler and fed into the uplink trunk line; and the second uplink detection signal is input to the third coupler through the second optical functional unit, and after being output from the third coupler, is reflected by the third reflector and input to the third coupler, a detection signal output from the third coupler passes through the fifth coupling apparatus, and then a second uplink detection loopback signal is output from the second coupler and fed into the downlink trunk line.

The first coupling apparatus includes a first coupler and a first reflector and is connected to a first isolator, and the fourth coupling apparatus includes a fourth coupler and a fourth reflector and is connected to a second isolator;

after the first downlink detection signal is output from the first coupler, the first downlink detection signal is reflected by the first reflector and input to the first coupler, and input to the fifth coupling apparatus through the first isolator, the first downlink detection signal passes through the fifth coupling apparatus, and then the first downlink detection loopback signal is output from the third coupling apparatus and fed into the uplink trunk line; and after the first uplink detection signal is output from the fourth coupler, the first uplink detection signal is reflected by the fourth reflector and input to the fourth coupler, and input to the fifth coupling apparatus through the second isolator, the first uplink detection signal passes through the fifth coupling apparatus, and then the first uplink detection loopback signal is output from the second coupling apparatus and fed into the downlink trunk line.

Wavelengths of the uplink detection signal and the downlink detection signal are different, the first coupling apparatus includes a first coupler and a first reflector and is connected to a first filter, and the fourth coupling apparatus includes a fourth coupler and a fourth reflector and is connected to a fourth filter;

after the first downlink detection signal is output from the first coupler, the first downlink detection signal is reflected by the first reflector and input to the first coupler, and input to the fifth coupling apparatus through the first filter, and the first downlink detection loopback signal is output from the third coupling apparatus through the fifth coupling apparatus and fed into the uplink trunk line; and after the first uplink detection signal is output from the fourth coupler, the first uplink detection signal is reflected by the fourth reflector and input to the fourth coupler, and input to the fifth coupling apparatus through the fourth filter, and the first uplink detection loopback signal is output from the second coupling apparatus through the fifth coupling apparatus and fed into the downlink trunk line.

The first coupling apparatus includes a first coupler and a first reflector, the second coupling apparatus includes a second coupler and a second reflector, the third coupling apparatus includes a third coupler 3 and a third reflector, and the fourth coupling apparatus includes a fourth coupler and a fourth reflector;

the apparatus further includes a first filter connected to the first coupling apparatus and the fifth coupling apparatus, a second filter connected to the second coupling apparatus and the fifth coupling apparatus, a third filter connected to the third coupling apparatus and the fifth coupling apparatus, and a fourth filter connected to the fourth coupling apparatus and the fifth coupling apparatus;

the first downlink detection signal passes through the first coupler, is input to the fifth coupling apparatus through the first filter, and passes through the fifth coupling apparatus, and then the first downlink detection loopback signal is output from the third coupler and fed into the uplink trunk line;

the second downlink detection signal is reflected by the second reflector and input to the second coupler, and input to the fifth coupling apparatus through the second filter, and passes through the fifth coupling apparatus, and then the second downlink detection loopback signal is output from the third coupler and fed into the uplink trunk line;

backscattered light generated in the downlink trunk line, namely, a third downlink detection signal, reversely passes through the second coupler, is fed into the fifth coupling apparatus through the second filter, passes through the fourth filter, reversely passes through the fourth coupler, passes through the fourth coupler again after being reflected by the fourth reflector, and is input to the third coupler after being coupled and input to the second optical functional unit, and a third downlink detection loopback signal is output from the third coupler and fed into the uplink trunk line;

the first uplink detection signal passes through the fourth coupler, is input to the fifth coupling apparatus through the fourth filter, and passes through the fifth coupling apparatus, and then the first uplink detection loopback signal is output from the second coupler and fed into the downlink trunk line;

the second uplink detection signal is reflected by the third reflector and input to the third coupler, and input to the fifth coupling apparatus through the third filter, and passes through the fifth coupling apparatus, and then the second uplink detection loopback signal is output from the second coupler and fed into the downlink trunk line; and backscattered light generated in the uplink trunk line, namely, a third uplink detection signal, reversely passes through the third coupler, is fed into the fifth coupling apparatus through the third filter, passes through the first filter, reversely passes through the first coupler, passes through the first coupler again after being reflected by the first reflector, and is input to the second coupler after being coupled and input to the first optical functional unit, and a third uplink detection loopback signal is output from the second coupler and fed into the downlink trunk line.

The first coupling apparatus, the second coupling apparatus, the third coupling apparatus, and the fourth coupling apparatus are all couplers in a 1×2 structure; and the fifth coupling apparatus is a coupler in an asymmetric 2×2 structure.

A system for detecting a submarine optical cable line includes a submarine cable line detecting device and a plurality of optical functional modules connected in series to an uplink trunk line and a downlink trunk line, where the submarine cable line detecting device is connected to the uplink trunk line and the downlink trunk line, and each optical functional module includes a first optical functional unit and a second optical functional unit for amplification and arranged in opposite transmission directions, where:

the optical functional module further includes a first coupling apparatus connected to an input end of the first optical functional unit, a second coupling apparatus connected to an output end of the first optical functional unit, a fourth coupling apparatus connected to an input end of the second optical functional unit, a third coupling apparatus connected to an output end of the second optical functional unit, and a fifth coupling apparatus respectively connected to the first coupling apparatus, the second coupling apparatus, the third coupling apparatus, and the fourth coupling apparatus;

during downlink line detecting, a downlink detection signal input to the first coupling apparatus from the submarine cable line detecting device is split into a first downlink detection signal and a second downlink detection signal; the first downlink detection signal passes through the fifth coupling apparatus, and then a first downlink detection loopback signal is output from the third coupling apparatus, fed into the uplink trunk line, and returned to the submarine cable line detecting device; and the second downlink detection signal is input to the second coupling apparatus through the first optical functional unit, a detection signal output from the second coupling apparatus passes through the fifth coupling apparatus, and then a second downlink detection loopback signal is output from the third coupling apparatus, fed into the uplink trunk line, and returned to the submarine cable line detecting device; and during uplink line detecting, an uplink detection signal input to the fourth coupling apparatus from the submarine cable line detecting device is split into a first uplink detection signal and a second uplink detection signal; the first uplink detection signal passes through the fifth coupling apparatus, and then a first uplink detection loopback signal is output from the second coupling apparatus, fed into the downlink trunk line, and returned to the submarine cable line detecting device; and the second uplink detection signal is input to the third coupling apparatus through the second optical functional unit, a detection signal output from the third coupling apparatus passes through the fifth coupling apparatus, and then a second uplink detection loopback signal is output from the second coupling apparatus, fed into the downlink trunk line, and returned to the submarine cable line detecting device.

In the present invention, line detecting includes detecting a downlink line and detecting an uplink line:

when detecting a downlink line, splitting a detection signal input to a first optical functional unit in an optical functional module of an optical cable line into a first downlink detection signal and a second downlink detection signal;

directly coupling and looping back the first downlink detection signal to an output end of a second optical functional unit in a direction opposite to the first optical functional unit in the same optical functional module to constitute a first downlink loopback path, and outputting a first downlink detection loopback signal at an uplink trunk line;

looping back the second downlink detection signal passing through the first optical functional unit to the output end of the second optical functional unit to constitute a second downlink loopback path, and outputting a second downlink detection loopback signal at the uplink trunk line; and detecting a status of the downlink submarine optical cable line according to power of the first downlink detection loopback signal and power of the second downlink detection loopback signal;

when detecting an uplink line, splitting a detection signal input to a second optical functional unit in an optical functional module of an optical cable line into a first uplink detection signal and a second uplink detection signal;

directly coupling and looping back the first uplink detection signal to an output end of a first optical functional unit in a direction opposite to the second optical functional unit in the same optical functional module to constitute a first uplink loopback path, and outputting a first uplink detection loopback signal at a downlink trunk line;

looping back the second uplink detection signal passing through the second optical functional unit to the output end of the first optical functional unit to constitute a second uplink loopback path, and outputting a second uplink detection loopback signal at the downlink trunk line; and detecting a status of the uplink submarine optical cable line according to power of the first uplink detection loopback signal and power of the second uplink detection loopback signal.

With the above technical solutions, according to the peak power of the first detection loopback signal and the peak power of the second detection loopback signal, the gain or loss of the corresponding optical functional unit may be obtained; the status information of the second-span optical cable of the optical functional module may be obtained according to the curve showing the change of the power of the second detection loopback signal with time; because the power of the first detection signal may be far greater than the power of the backscattered loopback signal in the prior art, the technical solutions are applicable to the scenario of long spans. In application scenarios of long spans, the failure mode beyond the line of sight of the backscattered signal may be distinguished according to whether the loopback signal includes the first detection loopback signal.

DETAILED DESCRIPTION OF THE EMBODIMENTS

To make the objectives, technical solutions, and advantages of the present invention more comprehensible, the following further describes the embodiments of the present invention are described in detail with reference to accompanying drawings.

In the embodiments of the present invention, the transport apparatus for detecting a submarine optical cable line, namely, an optical functional module, includes an optical repeater, an optical equalizer, an optical splitter, and so on. The optical functional module includes two optical functional units in opposite directions, for example, optical amplifiers in opposite directions.

A detection signal input to the optical functional unit is split into two parts. The first part of the detection signal is directly coupled and looped back in an input-to-output manner, and the second part of the detection signal passes through the optical functional unit and is looped back in an output-to-output manner. With the above method, both the downlink line and the uplink line may be detected. The gain or loss of the optical functional unit may be obtained according to the peak power of the first detection loopback signal and the peak power of the second detection loopback signal; the status information of the second-span optical cable of the optical functional module may be obtained according to the curve of the power of the second detection loopback signal and time; in addition, because the strength of the first detection loopback signal is far greater than the strength of the backscattered loopback signal in the prior art, the technical solutions of the present invention can be applied to detect the failure mode, which cannot be detected in the prior art, according to whether the loopback signal includes the first detection loopback signal.

Figure 1:
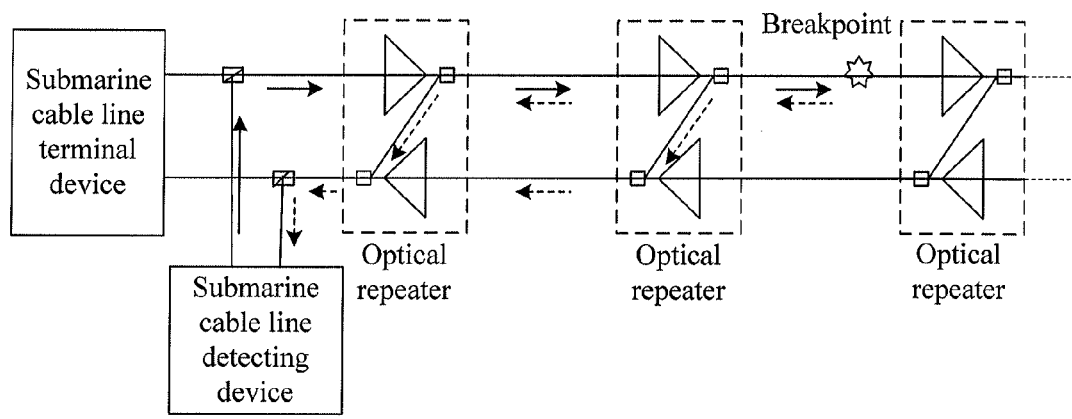
FIG. 1 is a schematic diagram of an output-to-output backscattered signal loopback detecting principle.
Figure 2:
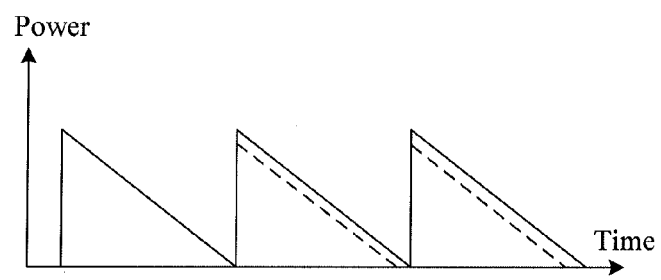
FIG. 2 is a schematic diagram of a detection curve of output-to-output backscattered loopback.
Figure 3:
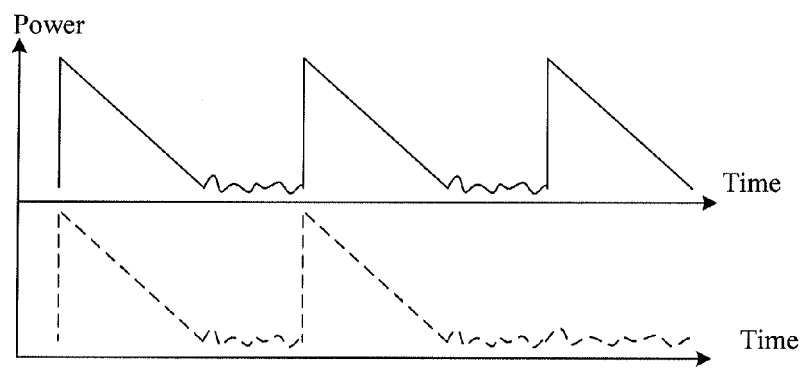
FIG. 3 is a schematic diagram of a detection curve of output-to-output backscattered loopback in long spans.
Figure 4:
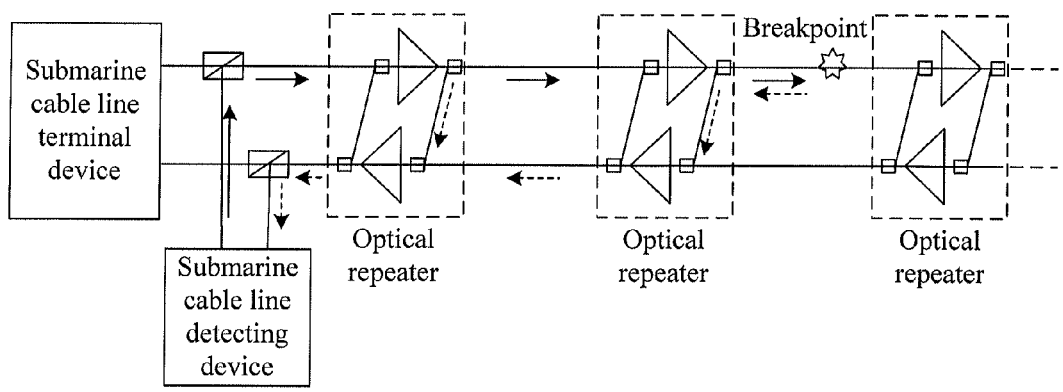
FIG. 4 is a schematic diagram of an output-to-input backscattered signal loopback detecting principle.
Figure 5:
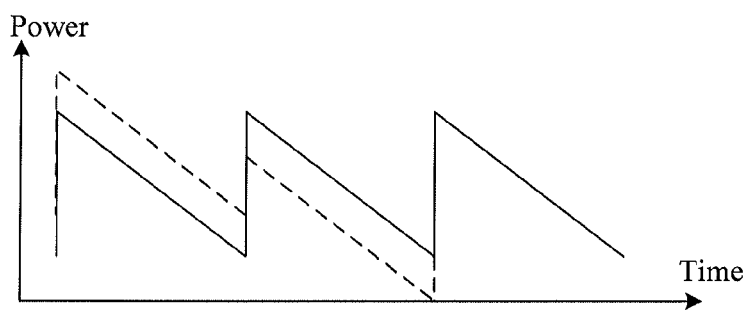
FIG. 5 is a schematic diagram of a detection curve of output-to-input backscattered loopback.
Figure 6:
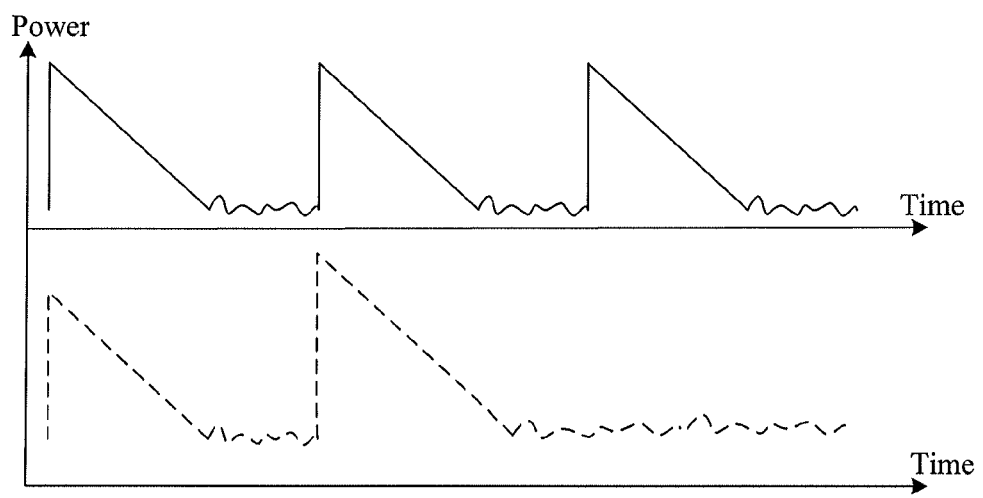
FIG. 6 is a schematic diagram of a detection curve of output-to-input backscattered loopback in long spans.
Figure 7:
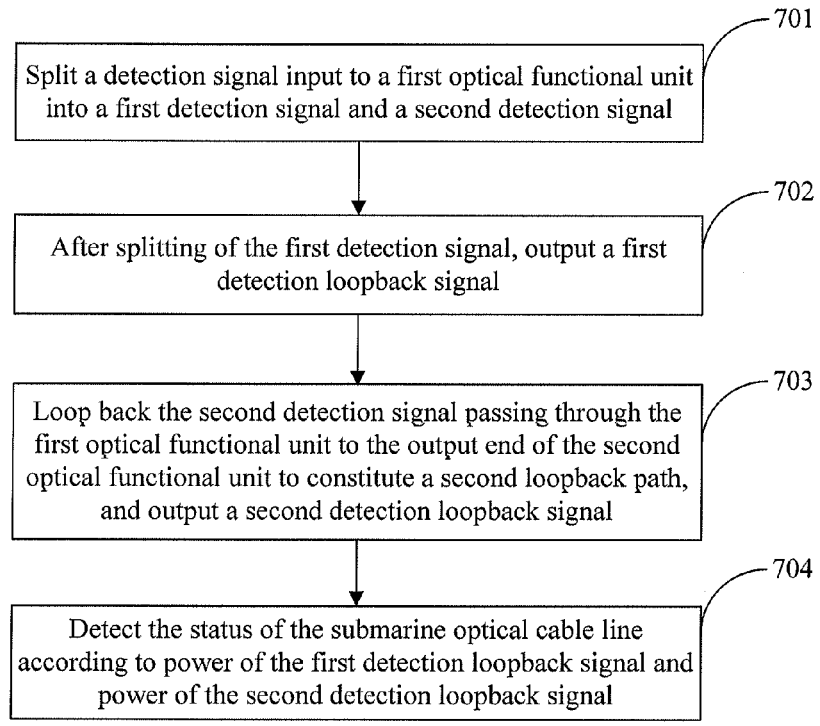
FIG. 7 is a schematic flowchart of a method for detecting a submarine optical cable line.

FIG. 7 is a schematic flowchart of a method for detecting a submarine optical cable line. The method specifically includes the following steps:

Step 701: Split a detection signal input to a first optical functional unit into a first detection signal and a second detection signal.

A submarine cable line detecting device sends a detection signal. The detection signal input to the first optical functional unit is split into a first detection signal and a second detection signal. The two detection signals pass through different paths to detect a status of the optical functional unit and a status of the optical cable line connecting optical functional units.

Step 702: Directly couple and loop back the first detection signal after the splitting to the output end of a second optical functional unit in a direction different from that of the first optical functional unit to constitute a first loopback path, and output a first detection loopback signal and return the first detection loopback signal to the optical cable line.

The first detection signal, after being split, is directly coupled and looped back to the output end of the second optical functional unit to constitute a first loopback path, and a first detection loopback signal is output at the uplink or downlink trunk line. The first detection loopback signal is a directly coupled loopback signal. The output first detection loopback signal is measured to obtain power of the first detection loopback signal. Directions of the second optical functional unit and first optical functional unit are different. For example, during the downlink detecting, the first optical functional unit is configured for downlink transmission, and the second optical functional unit is configured for uplink transmission.

The first optical functional unit is a downlink optical functional unit, and may detect the status of a downlink submarine optical cable line according to the power of the first detection loopback signal and the power of the second detection loopback signal; the first optical functional unit is an uplink optical functional unit, and may detect the status of an uplink submarine optical cable line according to the power of the first detection loopback signal and the power of the second detection loopback signal.

Step 703: Loop back the second detection signal passing through the first optical functional unit to the output end of the second optical functional unit to constitute a second loopback path, and output a second detection loopback signal.

The second detection signal passing through the first optical functional unit is fed into the optical cable line. The second detection signal passing through the first optical functional unit is looped back to the output end of the second optical functional unit to constitute a second loopback path, and a second detection loopback signal is output at the uplink or downlink trunk line, where the second detection loopback signal includes a backscattered loopback signal. The second detection loopback signal is measured to obtain power of the second detection loopback signal.

The detecting device sends pulsed light. The first detection loopback signal is a pulse signal, and the power of the second detection loopback signal is decided by the return time and pulse width. Power of the second detection loopback signals returned at different time with different pulse width is different.

Step 704: Detect the status of the submarine optical cable line according to power of the first detection loopback signal and power of the second detection loopback signal.

The optical functional module includes a first optical functional unit and a second optical functional unit. During downlink detecting, the first optical functional unit is a downlink optical functional unit, and the second optical functional unit is an uplink optical functional unit; during uplink detecting, the first optical functional unit is an uplink optical functional unit, and the second optical functional unit is a downlink optical functional unit.

Power of the first detection loopback signal is calculated according to a formula 3.

$$P(A)_{RX\_N} = P_{TX} + \sum_{1}^{N} G_i^{down} - \sum_{1}^{N-1} IL_i^{down} + IL(A)_N^{loopback} + \sum_{1}^{N-1} G_i^{up} - \sum_{1}^{N-1} IL_i^{up} \quad \text{(Formula 3)}$$

Power of the second detection loopback signal is calculated according to a formula 4.

$$P(B)_{RX\_N} = P_{TX} + \sum_{1}^{N} G_i^{down} - \sum_{1}^{N-1} IL_i^{down} + B_s - IL(B)_N^{loopback} + \sum_{1}^{N-1} G_i^{up} - \sum_{1}^{N-1} IL_i^{up} \quad \text{(Formula 4)}$$

$P(A)_{RX\_N}$ indicates power of a directly coupled loopback signal of the $N^{th}$ span, and $P(B)_{RX\_N}$ indicates power of a backscattered loopback signal of the $N^{th}$ span;

$P_{TX}$ indicates a detection signal generated by the line detecting device;

$G_i^{down}$ and $G_i^{up}$ respectively indicate gains of the $i^{th}$ first optical functional unit and second optical functional unit;

$IL_i^{down}$ and $IL_i^{up}$ respectively indicate losses of fibers in the downlink path and uplink path in the $i^{th}$ span;

$B_s$ indicates a ratio of power of a backscattered loopback signal; and $IL(A)_N^{loopback}$ and $IL(B)_N^{loopback}$ indicate a loss of a directly coupled loopback path in the $N^{th}$ optical functional module.

The following formula may be obtained by subtracting the formula 3 from the formula 4:

$$P(B)_{RX\_N} - P(A)_{RX\_N} = G_N^{down} + B_s - IL(B)_N^{loopback} + IL(A)_N^{loopback}$$

The following formula may be derived:

$$G_N^{down} = P(B)_{RX\_N} - P(A)_{RX\_N} = G_N^{down} + B_s - IL(B)_N^{loopback} + IL(A)_N^{loopback} \quad \text{(Formula 5)}$$

In the downlink direction, the gain $G_i^{down}$ of the first optical functional unit may be obtained according to power of the first detection loopback and power of the second detection loopback power according to formula 5; correspondingly, in the uplink direction, the gain $G_i^{down}$ of the second optical functional unit may be obtained according to the power of the first detection loopback and the power of the second detection loopback power according to the formula 5.

Figure 8:
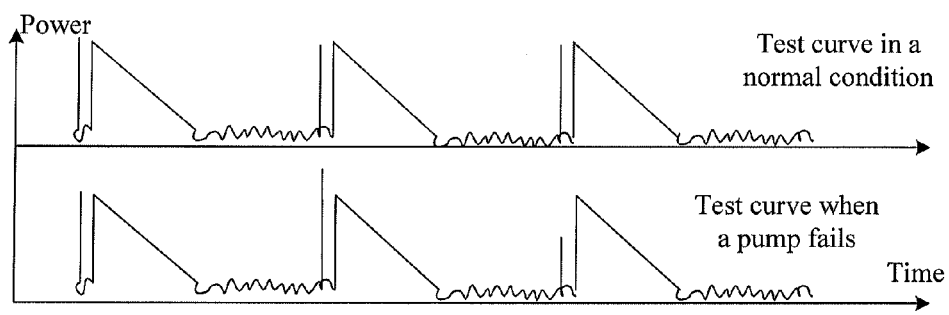
FIG. 8 is a schematic diagram when a pump of an optical functional module fails.

In FIG. 8, the upper part is a detection curve in the normal condition, and the lower part is a detection curve when a pump in the optical functional module fails. It can be seen from the lower part that, the power of the first detection loopback signal of the second optical functional unit is greater than the normal value. Therefore, the detection may directly indicate that the pump in the second optical functional unit fails.

Figure 9:
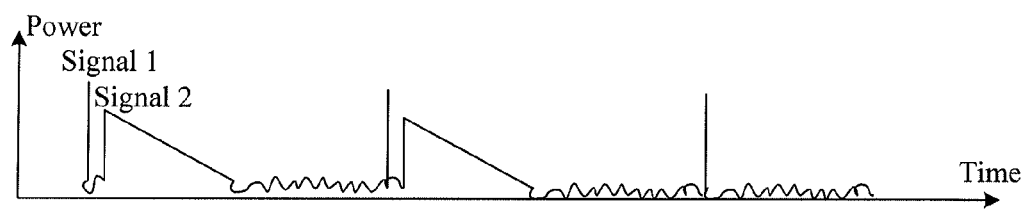
FIG. 9 is a schematic diagram of an internal failure of an optical functional module.

When the submarine failure mode is an internal failure of the optical functional module, for example, an electrical failure, the first detection loopback signal is still returned through the loopback path of the $N^{th}$ optical functional module, and the detection curve is shown in FIG. 9, where the end of the detection curve has a columnar pulse reflection peak. In FIG. 9, a signal 1 of each span is the first detection loopback signal; a signal 2 is the second detection loopback signal.

Figure 10:
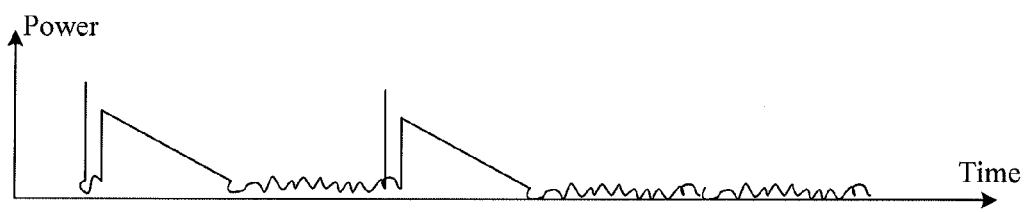
FIG. 10 is a schematic diagram of a failure of an optical cable.

When the submarine failure mode is that a fiber in the optical cable is broken, the first detection loopback signal cannot reach the next optical functional module and cannot be looped back. Therefore, the detection curve is shown in FIG. 10. Thereby, the submarine failure mode is determined. In the above process of determining the submarine failure, the determination result is clear, and misjudgment does not occur.

The first detection loopback signal and the second detection loopback signal have a time difference. As seen from FIG. 9, each optical functional module corresponds to a group of signals. The first pulse signal represents power of the first detection loopback signal, and the second zigzag signal represents power of the second detection loopback signal. The gain or loss of the first optical functional unit is obtained according to peaks of the pulse signal and zigzag signal.

Figure 11:
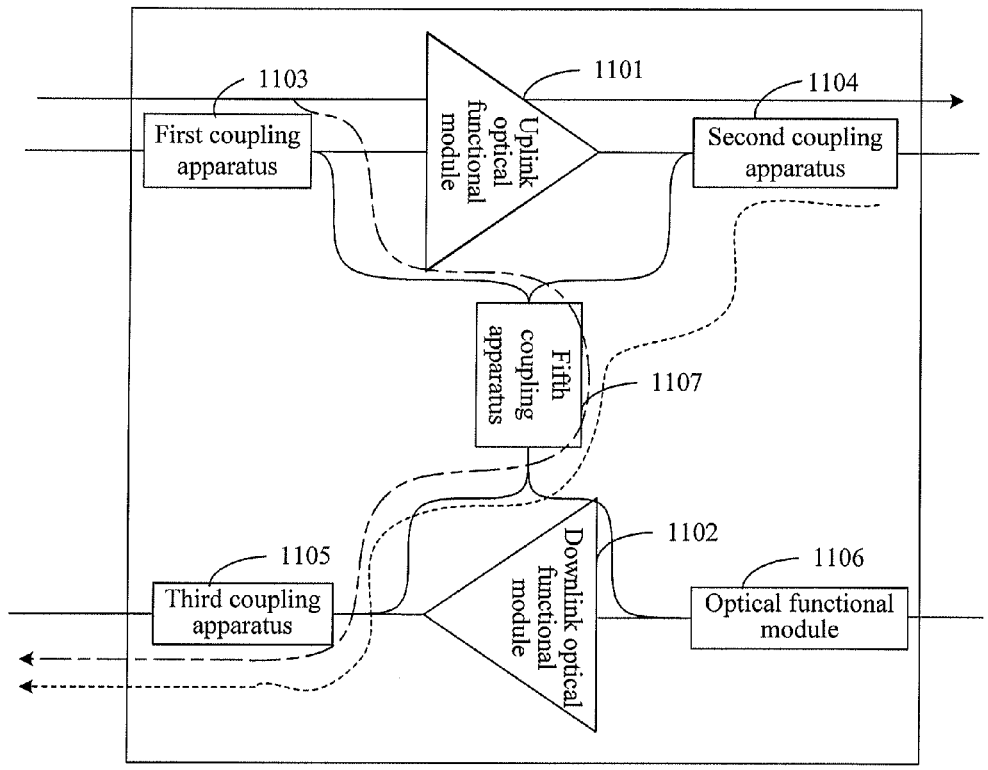
FIG. 11 is a schematic structural diagram of an apparatus for detecting a submarine optical cable line.

FIG. 11 is a schematic structural diagram of an apparatus for detecting a submarine optical cable line. The apparatus specifically includes: an uplink optical functional module 1101 and a downlink optical functional module 1102, a first coupling apparatus 1103 connected to the input end of the first optical functional unit, a second coupling apparatus 1104 connected to the output end of the first optical functional unit, a fourth coupling apparatus 1106 connected to an input end of the second optical functional unit, a third coupling apparatus 1105 connected to the output end of the second optical functional unit, and a fifth coupling apparatus 1107 respectively connected to the first coupling apparatus, the second coupling apparatus, the third coupling apparatus, and the fourth coupling apparatus. The coupling apparatus implements the function of splitting an optical signal.

In the actual application process, the first optical functional module may be a downlink optical functional unit, and the second optical functional module in a direction opposite to the first optical functional module is an uplink optical functional module. Conversely, if the first optical functional module is regarded as an uplink optical functional module, the second optical functional unit in a direction opposite to the first optical functional module is a downlink optical functional module. The downlink optical functional module and the uplink optical functional module are only relative.

In the downlink data direction, the front and back of the first optical functional unit 1101 of the optical functional module are respectively connected to the first coupling apparatus 1103 and the second coupling apparatus 1104. The first coupling apparatus 1103 couples a part of the detection signal of the input end of the first optical functional unit 1101, that is, the detection signal input to the first coupling apparatus 1103 is split into a first downlink detection signal and a second downlink detection signal. After the second downlink detection signal passes through the first optical functional unit 1101, the second coupling apparatus 1104 couples the signal from the output end of the first optical functional unit 1101. The front and back of the second optical functional unit 1102 of the optical functional module are respectively connected to the fourth coupling apparatus 1106 and the third coupling apparatus 1105, to implement the same functions as the first coupling apparatus 1103 and the second coupling apparatus 1104. The fifth coupling apparatus 1107 connects the first coupling apparatus 1103, the second coupling apparatus 1104, the third coupling apparatus 1105, and the fourth coupling apparatus 1106. The first detection signal directly coupled by the first coupling apparatus 1103 passes through the fifth coupling apparatus 1107 and the third coupling apparatus 1105, is fed into the uplink trunk line, and is returned to the submarine cable line detecting device; the signal coupled by the second coupling apparatus 1104 passes through the fifth coupling apparatus 1107 and the third coupling apparatus 1105 in sequence, is fed into the uplink trunk line, and is returned to the submarine cable line detecting device. Due to symmetry of the structure, the same loopback function is also implemented in the uplink direction.

The path for detecting the first detection loopback signal corresponding to the first detection signal in the downlink direction is: the first coupling apparatus→the fifth coupling apparatus→the third coupling apparatus; likewise, the path for detecting the first detection loopback signal corresponding to the first detection signal in the uplink direction is: fourth coupling apparatus→the fifth coupling apparatus→the second coupling apparatus. The path for detecting the second detection loopback signal corresponding to the second detection signal in the downlink direction is: second coupling apparatus→the fifth coupling apparatus→the third coupling apparatus; the path for detecting the second detection loopback signal corresponding to the second detection signal in the uplink direction is: third coupling apparatus→the fifth coupling apparatus→the second coupling apparatus.

Figure 12:
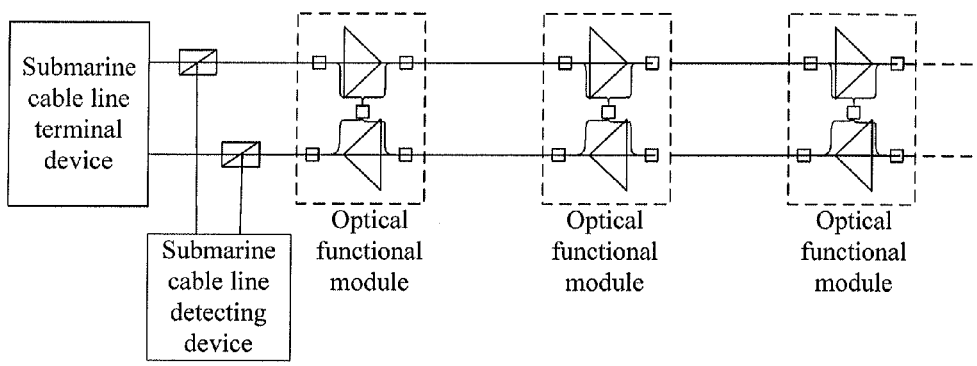
FIG. 12 is a networking diagram of detecting a submarine optical cable line.

FIG. 12 is a networking diagram of detecting a submarine optical cable line. FIG. 12 also includes a schematic diagram of a system for detecting a submarine optical cable line. The submarine cable line terminal device and the submarine cable line detecting device are respectively connected to the input end and the output end of the optical functional module. Each optical functional module includes the apparatuses shown in FIG. 11. The submarine cable line detecting device sends a detection signal to the optical functional module. In the optical functional module, the status of the optical cable line to be detected may be obtained according to the change of the power of the first detection loopback signal and the power of the second detection loopback signal with time. In the optical functional module, though a part of the detection signal may be lost when the detection signal passes through the coupling apparatus and optical cable, the optical functional unit can amplify the detection signal. Therefore, the detection signal input to the optical functional module is slightly different from the detection signal output by the optical functional module. The detection signal output from the optical functional module may be used as a detection signal of the next optical functional module.

The following describes in detail an example in which the optical functional module is an optical repeater.

Embodiment 1

Figure 13:
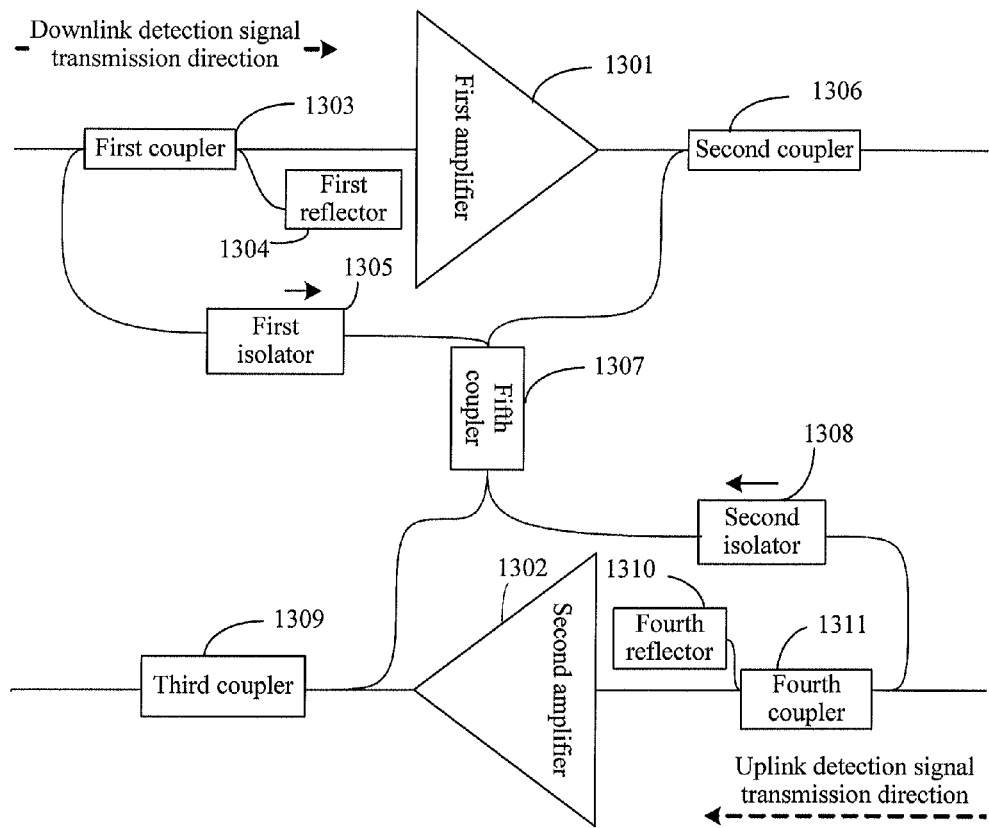
FIG. 13 is a schematic structural diagram of an apparatus for detecting a submarine optical cable line according to Embodiment 1.

FIG. 13 is a schematic structural diagram of an apparatus for detecting a submarine optical cable line according to Embodiment 1. The first coupling apparatus includes a first coupler 1303 and a first reflector 1304; the second coupling apparatus includes a second coupler 1306; the third coupling apparatus includes a third coupler 1309; and the fourth coupling apparatus includes a fourth coupler 1311 and a fourth reflector 1310. The optical repeater includes a pair of a first amplifier 1301 and a second amplifier 1302 for amplification and arranged in opposite transmission directions; the input end and output end of the first amplifier 1301 are respectively connected to the first coupler 1303 and the second coupler 1306; symmetrically, the input end and output end of the second amplifier 1302 are respectively connected to the fourth coupler 1311 and the third coupler 1309. The first coupler 1303, the second coupler 1306, the third coupler 1309, and the fourth coupler 1311 are respectively connected to the fifth coupler 1307; between the first coupler 1303 and the fifth coupler 1307, and between the fourth coupler 1311 and the fifth coupler 1307, the first isolator 1305 and the second isolator 1310 need to be connected respectively. The first reflector 1304 and the fourth reflector 1310 reflect only the detection signal $\lambda 1$.

In Embodiment 1, the first coupler 1303, the second coupler 1306, the third coupler 1309, and the fourth coupler 1311 are all in a 1×2 structure, and the fifth coupler 1307 is in a 2×2 structure. The coupler in the 2×2 structure splits both the forward and reverse transmitted light, and is usually symmetric. For example, after light is input to a port 1, x % is output from a port 2, and 1−x % is output from port 3; after light is input to the port 2, x % is output from the port 1, and 1−x % is output from a port 4.

The isolator is a unidirectional optical component, that is, the light can only pass through one end to the other end. The purpose of adding the first isolator 1305 in Embodiment 1 is to avoid, in the downlink process, interference of the detection signal reflected by the fourth reflector 1310 with the signal of the fifth coupler 1307, which may affect the output power. The function of the second isolator 1308 is similar to the function of the first isolator 1305. The reflector implements the function of reflecting light. The reflector may be designed to reflect only optical signals of a part of frequencies/wavelengths according to specific requirements. The purpose of adding a reflector in Embodiment 1 is to filter out-band noise light of a part of output detection signals of the coupler. The out-band noise light is an optical signal in a band different from the band of the input optical signal. Because the reflector reflects the reflected signal of a specific wavelength, the reflector outputs a part of detection signals, and the coupler outputs a part of detection signals.

When the downlink detection signal is different from the uplink detection signal, that is, the downlink detection signal is $\lambda 1$ and the uplink detection signal is $\lambda 2$, the isolator in FIG. 13 may also be replaced with a filter. The filter between the first coupler 1303 and the fifth coupler 1307 may allow only $\lambda 1$ to pass, and the filter between the fourth coupler 1311 and the fifth coupler 1307 may allow only $\lambda 2$ to pass. In this case, the function of the filter is the same as that of the isolator.

In FIG. 13, the transmission path of the detection signal in the optical repeater includes the following two parts:

The downlink detection signal $\lambda 1$ is input from the first coupler 1303, and is output after passing through the first amplifier 1301 and the second coupler 1306. The downlink detection signal $\lambda 1$ is input from the first coupler 1303, and then is split by the first coupler 1303 into two parts: a first detection signal and a second detection signal. The first detection signal is reflected by the first reflector 1304, and then is fed through the first coupler 1303, the first isolator 1305, the fifth coupler 1307, and the third coupler 1309 into the uplink trunk line and returned; the second detection signal amplified by the first amplifier 1301 is output by the second coupler 1306 and is fed into the downlink trunk line, and the Rayleigh backscattered light generated in the trunk line reversely passes through the second coupler 1306, and then is fed through the fifth coupler 1307 and the third coupler 1309 into the uplink trunk line for outputting. The second detection signal looped back by the second coupler 1306, relative to the first detection signal looped back by the first coupler 1303, has a certain delay $\Delta T$. The first detection loopback signal is a directly coupled loopback signal, and the second detection loopback signal includes a backscattered loopback signal. As seen from FIG. 14, the input end loopback signal corresponding to the first detection signal, namely, a first detection loopback signal, and the output loopback signal corresponding to the second detection signal, namely, a second detection loopback signal, have a time difference.

Likewise, the transmission path of the uplink detection signal and the transmission path of the downlink detection signal are symmetric.

The uplink detection signal $\lambda 1$ is input from the fourth coupler 1311, and is output after passing through the second amplifier 1302 and the third coupler 1309. The uplink detection signal $\lambda 1$ is input from the fourth coupler 1311, and then is split by the fourth coupler 1311 into two parts: a first detection signal and a second detection signal. The first detection signal is reflected by the fourth reflector 1310, and then is fed through the fourth coupler 1311, the second isolator 1308, the fifth coupler 1307, and the second coupler 1306 into the downlink trunk line and returned; the second detection signal amplified by the second amplifier 1302 is output by the third coupler 1309 and is fed into the uplink trunk line, and the Rayleigh backscattered light generated in the trunk line reversely passes through the third coupler 1309, and then is fed through the fifth coupler 1307 and the second coupler 1306 into the downlink trunk line for outputting a second detection loopback signal. The first detection loopback signal is a directly coupled loopback signal, and the second detection loopback signal includes a backscattered loopback signal.

Figure 14:
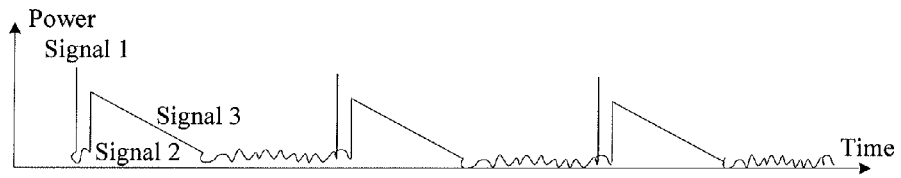
FIG. 14 is a schematic diagram of a detection curve according to Embodiment 1.
Figure 15:
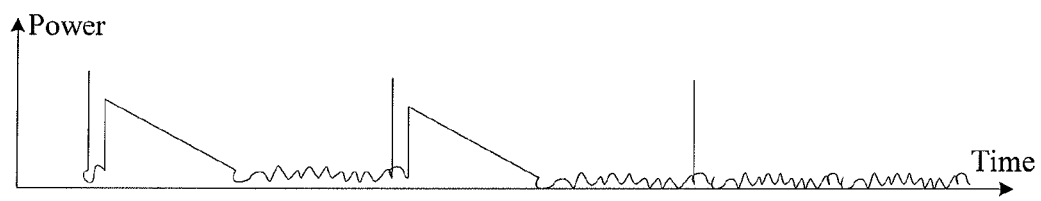
FIG. 15 is a schematic diagram of a detection curve of a failure of an optical repeater according to Embodiment 1.
Figure 16:
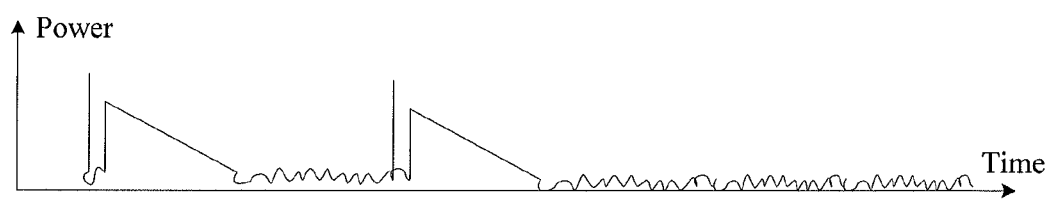
FIG. 16 is a schematic diagram of a detection curve of a failure of a submarine cable according to Embodiment 1.

The detection curve of the submarine cable system in the loopback structure in FIG. 13 is shown in FIG. 14, FIG. 15, and FIG. 16. A span in the detection curve represents an optical repeater. Each span includes two peak signals. A signal 1 represents the input end loopback signal corresponding to the first detection signal output from the third coupler 1309, namely, the first detection loopback signal, and a signal 2 represents the output loopback signal corresponding to the second detection signal output from the third coupler 1309, namely, the second detection loopback signal. The gain of the corresponding amplifier is obtained according to power of the first detection loopback signal and power of the second detection loopback signal. In addition, the second reflection peak is immediately followed by a diagonal line, namely, a signal 3, which is a backscattered optical signal and indicates the attenuation status of the transmission fiber. When the diagonal line falls or rises to the peak, it indicates that the status of the submarine optical cable is abnormal.

In FIG. 15, when the third optical repeater fails, because the first loopback path exists, the looped back detection signal can still be seen. That is, the power of the first detection loopback signal is not zero, and power of the second detection loopback signal is zero.

When the fiber before the third optical repeater is broken, the detection signal curve is shown in FIG. 16. That is, both the power of the first detection loopback signal and the power of the second detection loopback signal is zero.

On the basis of FIG. 13, the isolator 1 and isolator 2 may also be removed. The submarine optical cable line may still be detected according to the above technical solutions after the isolator 1 and isolator 2 are removed.

Embodiment 2

Figure 17:
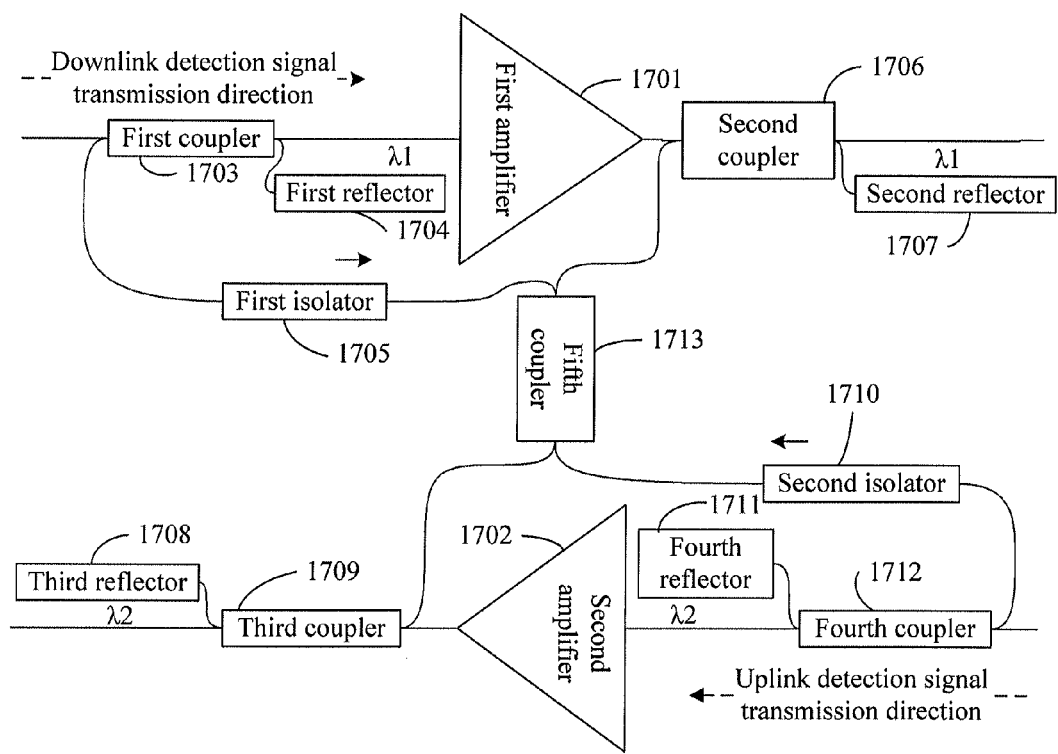
FIG. 17 is a schematic structural diagram of an apparatus for detecting a submarine optical cable line according to Embodiment 2.

FIG. 17 is a schematic structural diagram of an apparatus for detecting a submarine optical cable line according to Embodiment 2. The first coupling apparatus includes a first coupler 1703 and a first reflector 1704; the second coupling apparatus includes a second coupler 1706 and a second reflector 1707; the third coupling apparatus includes a third coupler 1709 and a third reflector 1708; and the fourth coupling apparatus includes a fourth coupler 1712 and a fourth reflector 1711. The optical repeater includes a first amplifier 1701 and a second amplifier 1702. The first amplifier 1701 and the second amplifier 1702 are used for amplification and arranged in opposite transmission directions; the input end and output end of the first amplifier 1701 are respectively connected to the first coupler 1703 and the second coupler 1706; symmetrically, the input end and output end of the second amplifier 1702 are respectively connected to the fourth coupler 1712 and the third coupler 1709. The first coupler 1703, the second coupler 1706, the third coupler 1709, and the fourth coupler 1712 are respectively connected to the fifth coupler 1713; an isolator needs to be connected respectively between the first coupler 1703 and the fifth coupler 1713 and between the fourth coupler 1712 and the fifth coupler 1713. The first reflector 1704 and the second reflector 1707 reflect only the detection signal $\lambda 1$; the third reflector 1708 and the fourth reflector 1711 reflect only the detection signal $\lambda 2$.

On the basis of the structure in FIG. 13, the second reflector 1707 is added to the output end of the second coupler 1706; the third reflector 1708 is added to the output end of the third coupler 1709. The purpose of adding the second reflector 1707 is to filter the output signal of the second coupler 1706, and input the filtered output signal to the second coupler 1706, where the input signal is much stronger than the only returned input Rayleigh backscattered light, and therefore is more obvious in the schematic diagram of the detection curve. Further, it is easier to determine the failure in the optical repeater. The function of the third reflector 1708 is the same as that of the second reflector 1707.

In FIG. 17, the transmission path of the detection signal in the optical repeater includes the following two parts:

The downlink detection signal $\lambda 1$ is input from the first coupler 1703, and is output after passing through the first amplifier 1701 and the second coupler 1706. The downlink detection signal $\lambda 1$ is input from the first coupler 1703, and then is split by the first coupler 1703 into two parts: a first detection signal and a second detection signal. The first detection signal is reflected by the first reflector 1704, and then is fed through the first coupler 1703, the first isolator 1705, the fifth coupler 1713, and the third coupler 1709 into the uplink trunk line and returned, and a first detection loopback signal is output and is a directly coupled loopback signal; the second detection signal amplified by the first amplifier 1701 is output by the second coupler 1706 and is fed into the downlink trunk line, and the detection signal passing through the second coupler 1706 is split into two parts: a first part of the detection signal and a second part of the detection signal. The proportions of the first part of the detection signal and the second part of the detection signal do not affect the technical solutions of the present invention. The first part of the detection signal passing through the second coupler 1706 is reflected by the second reflector 1707, and passes through the second coupler 1706; the backscattered light generated by the second part of the detection signal passing through the second coupler 1706 in the trunk line reversely passes through the second coupler 1706; after the detection signal and backscattered light reflected by the second reflector 1707 pass through the fifth coupler 1713 and the third coupler 1709, the detection signal and backscattered light are fed into the uplink trunk line for outputting a second detection loopback signal, where the second detection loopback signal includes a directly coupled loopback signal and a backscattered loopback signal. The second detection signal looped back by the second coupler 1706, relative to the first detection signal looped back by the first coupler 1703, has a certain delay $\Delta T$.

Likewise, the transmission path of the uplink detection signal and the transmission path of the downlink detection signal are symmetric.

The uplink detection signal $\lambda 2$ is input from the fourth coupler 1712, and is output after passing through the second amplifier 1702 and the third coupler 1709. The uplink detection signal $\lambda 2$ is input from the fourth coupler 1712, and then is split by the fourth coupler 1712 into two parts: a first detection signal and a second detection signal. The first detection signal is reflected by the fourth reflector 1711, and then is fed through the fourth coupler 1712, the second isolator 1710, the fifth coupler 1713, and the second coupler 1706 into the downlink trunk line and returned; the second detection signal amplified by the second amplifier 1702 is output by the third coupler 1709 and is fed into the uplink trunk line, and the detection signal passing through the third coupler 1709 is split into two parts: a first part of the detection signal and a second part of the detection signal. The proportions of the first part of the detection signal and the second part of the detection signal do not affect the technical solutions of the present invention. The first part of the detection signal passing through the third coupler 1709 is reflected by the third reflector 1708, and passes through the third coupler 1709; the backscattered light generated by the second part of the detection signal passing through the third coupler 1709 in the trunk line reversely passes through the coupler; after the detection signal and backscattered light reflected by the third reflector 1708 pass through the fifth coupler 1713 and the second coupler 1706, the detection signal and backscattered light are fed into the downlink trunk line for outputting. The first detection loopback signal is a directly coupled loopback signal, and the second detection loopback signal includes a directly coupled loopback signal and a backscattered loopback signal.

In Embodiment 2, the downlink detection signal is $\lambda 1$, and the uplink detection signal is $\lambda 2$. Thereby, a failure may be precisely located according to different wavelengths. Of course, the downlink detection signal may be the same as the uplink detection signal. When the downlink detection signal is different from the uplink detection signal, that is, the downlink detection signal is $\lambda 1$ and the uplink detection signal is $\lambda 2$, the isolator in FIG. 17 may also be replaced with a filter. The filter between the first coupler 1703 and the second coupler 1706 may allow only $\lambda 1$ to pass, and the filter between the fourth coupler 1712 and the fifth coupler 1713 may allow only $\lambda 2$ to pass. The failure detection curve in Embodiment 2 is the same as that in the first embodiment, and is not further repeated. In Embodiment 2, the second detection loopback signal includes a directly coupled loopback signal and a backscattered loopback signal. The gain or loss of the corresponding amplifier is obtained by calculation according to the power of the first detection loopback signal and the power of the second detection loopback signal including the directly coupled loopback signal and the backscattered loopback signal.

In addition, on the basis of FIG. 17, the first reflector 1704 and the first isolator 1705, and the fourth reflector 1711 and the second isolator 1710 may be removed. To be specific, the first coupling apparatus includes a first coupler 1703, and the fourth coupling apparatus includes a fourth coupler 1712; the second coupling apparatus includes a second coupler 1706 and a second reflector 1707; the third coupling apparatus includes a third coupler 1709 and a third reflector 1708.

Paths of the first downlink and uplink detection signals are the same as paths of the downlink and uplink detection signals in FIG. 11.

The second downlink detection signal is input to the second coupler 1706 through the first optical functional unit, namely, the first amplifier 1701, and after being output from the second coupler 1706, is reflected by the second reflector 1707 and input to the second coupler 1706, a detection signal output from the second coupler 1706 passes through the fifth coupler 1713, and then a second downlink detection loopback signal is output from the third coupler 1709 and fed into the uplink trunk line.

The second uplink detection signal is input to the third coupler 1709 through the second optical functional unit, namely, the second amplifier 1702, and after being output from the third coupler 1709, is reflected by the third reflector 1708 and input to the third coupler 1709, a detection signal output from the third coupler 1709 passes through the fifth coupler 1713, and then a second uplink detection loopback signal is output from the second coupler 1706 and fed into the downlink trunk line.

Embodiment 3

Figure 18:
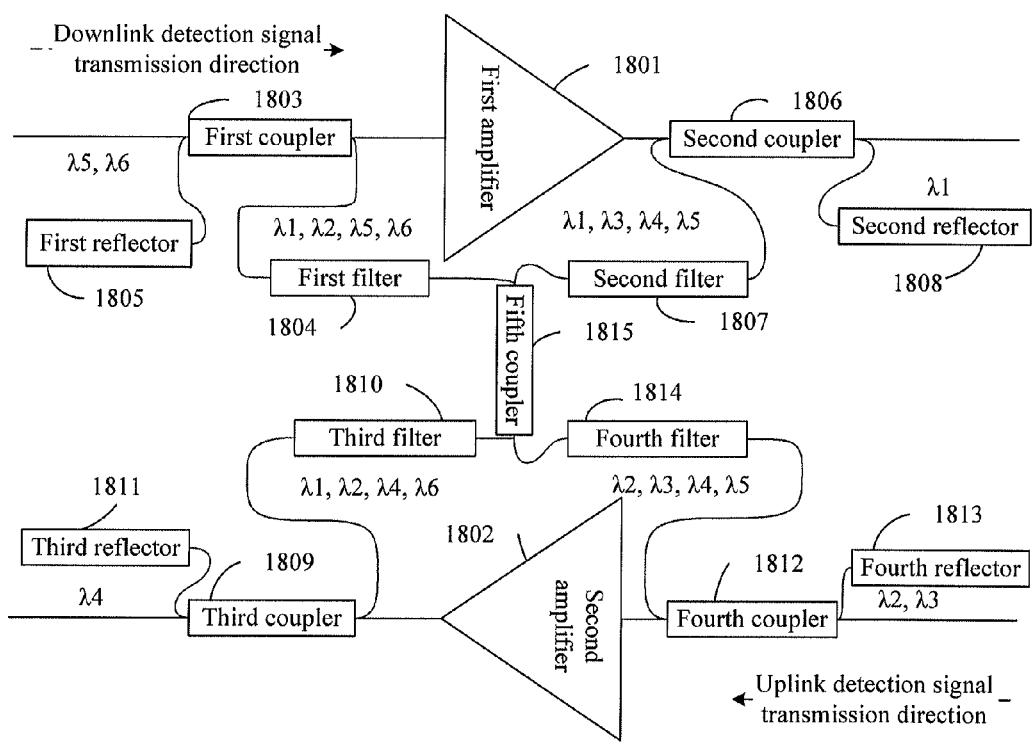
FIG. 18 is a schematic structural diagram of an apparatus for detecting a submarine optical cable line according to Embodiment 3.

FIG. 18 is a schematic structural diagram of an apparatus for detecting a submarine optical cable line according to Embodiment 3. The first coupling apparatus includes a first coupler 1803 and a first reflector 1805; the second coupling apparatus includes a second coupler 1806 and a second reflector 1808; the third coupling apparatus includes a third coupler 1809 and a third reflector 1811; and the fourth coupling apparatus includes a fourth coupler 1812 and a fourth reflector 1813. The optical repeater includes a pair of a first amplifier 1801 and a second amplifier 1802 for amplification and arranged in opposite transmission directions; the input end and output end of the first amplifier 1801 are respectively connected to the first coupler 1803 and the second coupler 1806; symmetrically, the input end and output end of the second amplifier 1802 are respectively connected to the third coupler 1809 and the fourth coupler 1812. The first coupler 1803, the second coupler 1806, the third coupler 1809, and the fourth coupler 1812 are respectively connected to the fifth coupler 1815. The first filter 1804 is connected between the first coupler 1803 and the fifth coupler 1815; the second filter 1807 is connected between the second coupler 1806 and the fifth coupler 1815; the third filter 1810 is connected between the third coupler 1809 and the fifth coupler 1815; and the fourth filter 1814 is connected between the fourth coupler 1812 and the fifth coupler 1815. The input end of the first coupler 1803 is connected to the first reflector 1805; the input end of the second coupler 1806 is connected to the second reflector 1808; the input end of the third coupler 1809 is connected to the third reflector 1811; and the input end of the fourth coupler 1812 is connected to the fourth reflector 1813.

The uplink detection signal including $\lambda 1$, $\lambda 2$, and $\lambda 3$ is located on one side of a service wavelength, for example, a short wavelength; the downlink detection signal including $\lambda 4$, $\lambda 5$, and $\lambda 6$ is located on one side of a service wavelength, for example, a long wavelength.

The first reflector 1805 reflects $\lambda 5$ and ?6; the second reflector 1808 reflects $\lambda 1$; the third reflector 1811 reflects $\lambda 4$; the fourth reflector 1813 reflects $\lambda 2$ and $\lambda 3$. The first filter 1804 selects to allow $\lambda 1$, $\lambda 2$, $\lambda 5$, and $\lambda 6$ to pass; the second filter 1807 selects to allow $\lambda 1$, $\lambda 3$, $\lambda 4$, and $\lambda 5$ to pass; the third filter 1810 selects to allow $\lambda 2$, $\lambda 4$, and $\lambda 6$ to pass; the fourth filter 1814 selects to allow $\lambda 2$, $\lambda 3$, $\lambda 4$, and $\lambda 5$ to pass. The following describes the present invention in detail by taking an example in which $\lambda 1$, $\lambda 2$, and $\lambda 3$ are the detection signal respectively. The transmission path of the detection signal in the optical repeater includes the following three processes:

1. The downlink detection signal is input from the first coupler 1803, and is output after passing through the first amplifier 1801 and the second coupler 1806. After $\lambda 1$ is split, a downlink/uplink detection loopback signal corresponding to the first detection signal is output, and a downlink/uplink detection loopback signal corresponding to the second detection signal is output. The downlink detection signal $\lambda 1$ is input from the first coupler 1803, and then is split by the first coupler 1803 into two parts: a first detection signal and a second detection signal. After the first detection signal passes through the first filter 1804, the fifth coupler 1815, and the third coupler 1809, the first detection signal is fed into the uplink trunk line and returned; the second detection signal is split into two beams after passing through the second coupler 1806, where one beam is fed into the downlink trunk line after being output by the second coupler 1806, and the other beam is reflected by the second reflector 1808 and is fed into the uplink trunk line for outputting after passing through the second coupler 1806, then the second filter 1807, the fifth coupler 1815, and the third coupler 1809. The detection signal looped back from the second coupler 1806, corresponding to the second detection signal amplified by the first amplifier 1801, has a certain delay $\Delta T$ relative to the detection signal looped back by the first coupler 1803.

The power of the detection signal looped back from the second coupler 1806 is the power of the second detection loopback signal, and the power of the detection signal looped back from the first coupler 1803 is the power of the first detection loopback signal. In this case, the first detection loopback signal is a directly coupled loopback signal, and the second detection loopback signal includes a directly coupled loopback signal.

2. The downlink detection signal $\lambda 2$ is input from the first coupler 1803, and then is split by the first coupler 1803 into two parts: a first detection signal and a second detection signal. After $\lambda 2$ is split, corresponding to the second detection signal, a third downlink/uplink detection loopback signal is output, and a fourth downlink/uplink detection loopback signal is output. The first detection signal is amplified by the first amplifier 1801 and then is fed into the downlink trunk line after passing through the second coupler 1806. The second detection signal passes through the first filter 1804, and then is split by the fifth coupler 1815 into two parts: a first part of the detection signal and a second part of the detection signal. The proportions of the first part of the detection signal and the second part of the detection signal do not affect the technical solutions of the present invention. After passing through the third filter 1810 and the third coupler 1809, the first part of the detection signal is fed into the uplink trunk line and returned, and a third downlink/uplink detection loopback signal is output; after the second part of the detection signal passes through the fifth filter 1814 and the fourth coupler 1812, and then is reflected by the fourth reflector 1813, the second part of the detection signal passes through the fourth coupler 1812, is amplified by the second amplifier 1802, and is fed into the uplink trunk line after passing through the third coupler 1809, and a fourth downlink/uplink detection loopback signal is output. The power of the detection signal passing through the third filter 1810 and the third coupler 1809 is the power of the third detection loopback signal, and the power of the detection signal passing through the second amplifier 1802 and the third coupler 1809 is the power of the fourth detection loopback signal. Two beams of loopback light have a delay $\Delta T2$. In this case, the third detection loopback signal is a directly coupled loopback signal, and the fourth detection loopback signal includes a directly coupled loopback signal.

3. The downlink detection signal light $\lambda 3$ is input from the first coupler 1803, then is amplified by the first amplifier 1801, and is fed into the downlink trunk line through the second coupler 1806; the Rayleigh backscattered light generated in the trunk line, namely, a third downlink/uplink detection signal, is fed into the second coupler 1806, and then passes through the second filter 1807, the fifth coupler 1815, the fourth filter 1814, and then the fourth coupler 1812, then is reflected by the fourth reflector 1813, reversely passes through the fourth coupler 1812, and then is amplified by the second amplifier 1802, and finally a fifth downlink/uplink detection loopback signal is output through the third coupler 1809. In this case, the fifth downlink/uplink detection loopback signal is a backscattered loopback signal. The Rayleigh backscattered light generated by $\lambda 3$ in the trunk line corresponds to the fifth downlink/uplink detection loopback signal.

Figure 19:
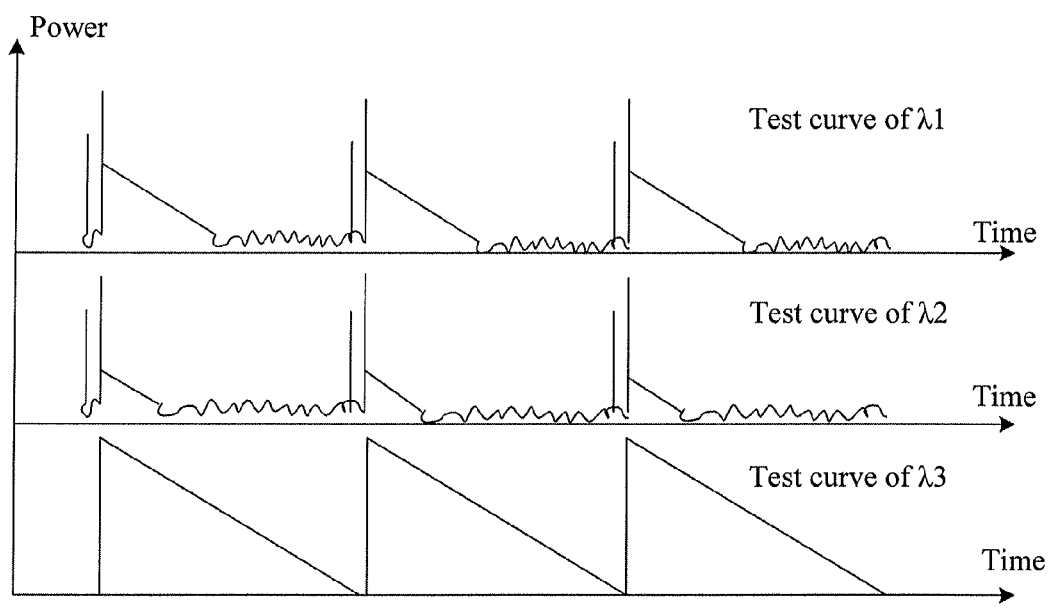
FIG. 19 is a schematic diagram of a detection curve of an optical repeater according to Embodiment 4.

In the downlink direction, the detection curves of $\lambda 1$, $\lambda 2$, and $\lambda 3$ are as shown in FIG. 19. In FIG. 19, the upper part is a schematic diagram of a detection curve of $\lambda 1$. The gain of the downlink optical amplifier in the optical repeater in $\lambda 1$ is obtained according to the detection curve of $\lambda 1$ and according to the power of the first detection loopback signal and the power of the second detection loopback signal. In FIG. 19, the middle part is a schematic diagram of a detection curve of $\lambda 2$. The gain of the uplink optical amplifier in the optical repeater in $\lambda 2$ is obtained according to the detection curve of $\lambda 2$ and according to the power of the third detection loopback signal and the power of the fourth detection loopback signal. In FIG. 19, the lower part is a schematic diagram of a detection curve of $\lambda 3$. The fifth detection loopback signal output by the $\lambda 3$ detection signal is a backscattered loopback signal. The curve of the return time of the fifth detection loopback signal indicates the backscattered signal of the fiber between optical repeaters, and indicates the loss status of the fiber in the optical cable. When the diagonal line falls or rises to the peak, it indicates that the status of the fiber is abnormal. As seen above, the apparatus in FIG. 18 may be used to detect gains of the uplink and downlink optical functional units at the same end, and may also detect the status of the optical cable.

Likewise, transmission paths of uplink detection signals $\lambda 4$, $\lambda 5$, and $\lambda 6$ are symmetric to those of downlink detection signals $\lambda 1$, $\lambda 2$, and $\lambda 3$, and are not further described in detail.

In addition, $\lambda 1$ and $\lambda 2$ are arranged in a band different from that of $\lambda 5$ and $\lambda 6$, for example, respectively located in a short-wave band and a long-wave band of the bandwidth amplified by the optical repeater. The detecting system may compare $\lambda 1$ with $\lambda 6$, and $\lambda 2$ with $\lambda 5$ to measure the gain of the same uplink/downlink amplifier to analyze the equalization status of the line, which provides visual reference data for optimizing system performance.

In Embodiment 3, in addition to the first loopback path and the second loopback path, which are used to detect the status of the optical functional unit, a third loopback path is also provided, namely, an output-to-input backscattered signal loopback path, which is used to detect the status of the optical cable. The backscattered signal additionally obtains the gain of an optical repeater relative to that in Embodiment 3 and Embodiment 2, and a longer line-of-sight distance of the backscattered signal in a span may be achieved.

The foregoing descriptions are merely exemplary embodiments of the present invention, but are not intended to limit the protection scope of the present invention. Any modification, equivalent replacement, or improvement made within the spirit and principle of the present invention shall fall within the protection scope of the present invention.

What is claimed is:

1. A method for detecting a submarine optical cable line, comprising:

during line detecting, splitting a detection signal input to a first optical functional unit in an optical functional module of an optical cable line into a first detection signal and a second detection signal;

directly coupling and looping back the first detection signal to an output end of a second optical functional unit in a direction opposite to the first optical functional unit in the optical functional module to constitute a first loopback path, and outputting a first detection loopback signal at a trunk line;

looping back the second detection signal passing through the first optical functional unit to the output end of the second optical functional unit to constitute a second loopback path, and outputting a second detection loopback signal at the trunk line; and detecting a status of the submarine optical cable line according to power of the first detection loopback signal and power of the second detection loopback signal; wherein the detecting a status of the submarine optical cable line according to power of the first detection loopback signal and power of the second detection loopback signal comprises: if the power of the first detection loopback signal and the power of the second detection loopback signal are both zero, determining that the trunk line fails; if the power of the first detection loopback signal is not zero and the power of the second detection loopback signal is zero, determining that the first optical functional unit fails; and if neither the power of the first detection loopback signal nor the power of the second detection loopback signal is zero, obtaining a gain or loss of the first optical functional unit according to the power of the first detection loopback signal and the power of the second detection loopback signal.

2. The method for detecting a submarine optical cable line according to claim 1, wherein the looping back the second detection signal passing through the first optical functional unit to the output end of the second optical functional unit comprises: feeding the second detection signal passing through the first optical functional unit into the trunk line, and coupling and looping back backscattered light generated in the optical cable to the output end of the second optical functional unit.

3. The method for detecting a submarine optical cable line according to claim 1, wherein the looping back the second detection signal passing through the first optical functional unit to the output end of the second optical functional unit comprises: reflecting a part of the second detection signal passing through the first optical functional unit, and looping back the reflected detection signal to the output end of the second optical functional unit.

4. The method for detecting a submarine optical cable line according to claim 2, wherein the looping back the second detection signal passing through the first optical functional unit to the output end of the second optical functional unit comprises: reflecting a part of the second detection signal passing through the first optical functional unit, and looping back the reflected detection signal to the output end of the second optical functional unit.

5. The method for detecting a submarine optical cable line according to claim 1, further comprising:
during line detecting, splitting a detection signal input to the first optical functional unit into a third detection signal and a fourth detection signal, and feeding the fourth detection signal to the trunk line after the fourth detection signal passes through the first optical functional unit;
directly coupling and looping back a first part of the third detection signal to the output end of the second optical functional unit, and outputting a third detection loopback signal at the trunk line; and
coupling and inputting a second part of the third detection signal to an input end of the second optical functional unit, and outputting a fourth detection loopback signal at the trunk line after the second part of the third detection signal passes through the second optical functional unit.

6. The method for detecting a submarine optical cable line according to claim 1, further comprising:
during line detecting, feeding the detection signal input to the first optical functional unit to the trunk line after the detection signal passes through the first optical functional unit, and coupling and looping back backscattered light generated in the trunk line to the input end of the second optical functional unit, and after the backscattered light passes through the second optical functional unit, outputting a fifth detection loopback signal at the trunk line; and
determining a loss status of a fiber in the submarine optical cable according to a curve of power of the fifth detection loopback signal and return time of the power of the fifth detection loopback signal.

7. The method for detecting a submarine optical cable line according to claim 4, further comprising:
during line detecting, feeding the detection signal input to the first optical functional unit to the trunk line after the detection signal passes through the first optical functional unit, and coupling and looping back backscattered light generated in the trunk line to the input end of the second optical functional unit, and after the backscattered light passes through the second optical functional unit, outputting a fifth detection loopback signal at the trunk line; and
determining a loss status of a fiber in the submarine optical cable according to a curve of power of the fifth detection loopback signal and return time of the power of the fifth detection loopback signal.

8. The method for detecting a submarine optical cable line according to claim 4, further comprising:
during line detecting, if the power of the third detection loopback signal and the power of the fourth detection loopback signal are both zero, determining that the trunk line fails; if the power of the third detection loopback signal is not zero and the power of the fourth detection loopback signal is zero, determining that the second optical functional unit fails; and if neither the power of the third detection loopback signal nor the power of the fourth detection loopback signal is zero, obtaining a gain or loss of the second optical functional unit according to the power of the third detection loopback signal and the power of the fourth detection loopback signal.

9. The method for detecting a submarine optical cable line according to claim 1, wherein: the first optical functional unit is a downlink optical functional unit, and the detecting a status of the submarine optical cable line according to power of the first detection loopback signal and power of the second detection loopback signal comprises: detecting a status of a downlink submarine optical cable line according to the power of the first detection loopback signal and the power of the second detection loopback signal; or
the first optical functional unit is an uplink optical functional unit, and the detecting a status of the submarine optical cable line according to power of the first detection loopback signal and power of the second detection loopback signal comprises: detecting a status of an uplink submarine optical cable line according to the power of the first detection loopback signal and the power of the second detection loopback signal.

10. The method for detecting a submarine optical cable line according to claim 1, further comprising: filtering out-band noise light of the first detection loopback signal in the first loopback path, and/or filtering out-band noise light of the second detection loopback signal in the second loopback path.

11. A transport apparatus for detecting a submarine optical cable line, comprising a first optical functional unit and a second optical functional unit, and further comprising: a first coupling apparatus connected to an input end of the first optical functional unit, a second coupling apparatus connected to an output end of the first optical functional unit, a fourth coupling apparatus connected to an input end of the second optical functional unit, a third coupling apparatus connected to an output end of the second optical functional unit, and a fifth coupling apparatus respectively connected to the first coupling apparatus, the second coupling apparatus, the third coupling apparatus, and the fourth coupling apparatus, wherein:
during downlink line detecting, a downlink detection signal input to the first coupling apparatus is split into a first downlink detection signal and a second downlink detection signal; the first downlink detection signal passes through the fifth coupling apparatus, and then a first downlink detection loopback signal is output from the third coupling apparatus and fed into an uplink trunk line; and the second downlink detection signal is input to the second coupling apparatus through the first optical functional unit, a detection signal output from the second coupling apparatus passes through the fifth coupling apparatus, and then a second downlink detection loopback signal is output from the third coupling apparatus and fed into the uplink trunk line; wherein a status of the submarine optical cable line is detected according to power of the first downlink detection loopback signal and power of the second downlink detection loopback signal; wherein the detecting a status of the submarine optical cable line according to power of the first downlink detection loopback signal and power of the second downlink detection loopback signal comprises: if the power of the first downlink detection loopback signal and the power of the second downlink detection loopback signal are both zero, determining that the uplink trunk line fails; if the power of the first downlink detection loopback signal is not zero and the power of the second downlink detection loopback signal is zero, determining that the first optical functional unit fails; and if neither the power of the first downlink detection loopback signal nor the power of the second detection loopback signal is zero, obtaining a gain or loss of the first optical functional unit according to the power of the first detection loopback signal and the power of the second detection loopback signal; and during uplink line detecting, an uplink detection signal input to the fourth coupling apparatus is split into a first uplink detection signal and a second uplink detection signal; the first uplink detection signal passes through the fifth coupling apparatus, and then a first uplink detection loopback signal is output from the second coupling apparatus and fed into a downlink trunk line; and the second uplink detection signal is input to the third coupling apparatus through a second optical functional unit, a detection signal output from the third coupling apparatus passes through the fifth coupling apparatus, and then a second uplink detection loopback signal is output from the second coupling apparatus and fed into the downlink trunk line.

12. The transport apparatus for detecting a submarine optical cable line according to claim 9, wherein: the second coupling apparatus comprises a second coupler and a second reflector, and the third coupling apparatus comprises a third coupler and a third reflector;

the second downlink detection signal is input to the second coupler through the first optical functional unit, and after being output from the second coupler, is reflected by the second reflector and input to the second coupler, a detection signal output from the second coupler passes through the fifth coupling apparatus, and then a second downlink detection loopback signal is output from the third coupler and fed into the uplink trunk line; and the second uplink detection signal is input to the third coupler through the second optical functional unit, and after being output from the third coupler, is reflected by the third reflector and input to the third coupler, a detection signal output from the third coupler passes through the fifth coupling apparatus, and then a second uplink detection loopback signal is output from the second coupler and fed into the downlink trunk line.

13. The transport apparatus for detecting a submarine optical cable line according to claim 11, wherein: the first coupling apparatus comprises a first coupler and a first reflector and is connected to a first isolator, and the fourth coupling apparatus comprises a fourth coupler and a fourth reflector and is connected to a second isolator;

after the first downlink detection signal is output from the first coupler, the first downlink detection signal is reflected by the first reflector and input to the first coupler, and input to the fifth coupling apparatus through the first isolator, the first downlink detection signal passes through the fifth coupling apparatus, and then the first downlink detection loopback signal is output from the third coupling apparatus and fed into the uplink trunk line; and after the first uplink detection signal is output from the fourth coupler, the first uplink detection signal is reflected by the fourth reflector and input to the fourth coupler, and input to the fifth coupling apparatus through the second isolator, the first uplink detection signal passes through the fifth coupling apparatus, and then the first uplink detection loopback signal is output from the second coupling apparatus and fed into the downlink trunk line.

14. The transport apparatus for detecting a submarine optical cable line according to claim 12, wherein: the first coupling apparatus comprises a first coupler and a first reflector and is connected to a first isolator, and the fourth coupling apparatus comprises a fourth coupler and a fourth reflector and is connected to a second isolator;

after the first downlink detection signal is output from the first coupler, the first downlink detection signal is reflected by the first reflector and input to the first coupler, and input to the fifth coupling apparatus through the first isolator, the first downlink detection signal passes through the fifth coupling apparatus, and then the first downlink detection loopback signal is output from the third coupling apparatus and fed into the uplink trunk line; and after the first uplink detection signal is output from the fourth coupler, the first uplink detection signal is reflected by the fourth reflector and input to the fourth coupler, and input to the fifth coupling apparatus through the second isolator, the first uplink detection signal passes through the fifth coupling apparatus, and then the first uplink detection loopback signal is output from the second coupling apparatus and fed into the downlink trunk line.

15. The transport apparatus for detecting a submarine optical cable line according to claim 11, wherein: wavelengths of the uplink detection signal and the downlink detection signal are different, the first coupling apparatus comprises a first coupler and a first reflector and is connected to a first filter, and the fourth coupling apparatus comprises a fourth coupler and a fourth reflector and is connected to a fourth filter;

after the first downlink detection signal is output from the first coupler, the first downlink detection signal is reflected by the first reflector and input to the first coupler, and input to the fifth coupling apparatus through the first filter, and the first downlink test signal passes through the fifth coupling apparatus, and then the first uplink detection loopback signal is output from the second coupling apparatus and fed into the uplink trunk line; and after the first uplink detection signal is output from the fourth coupler, the first uplink detection signal is reflected by the fourth reflector and input to the fourth coupler, and input to the fifth coupling apparatus through the fourth filter, and the first downlink test signal passes through the fifth coupling apparatus, and then the first uplink detection loopback signal is output from the second coupling apparatus and fed into the uplink trunk line.

16. The transport apparatus for detecting a submarine optical cable line according to claim 12, wherein: wavelengths of the uplink detection signal and the downlink detection signal are different, the first coupling apparatus comprises a first coupler and a first reflector and is connected to a first filter, and the fourth coupling apparatus comprises a fourth coupler and a fourth reflector and is connected to a fourth filter;

after the first downlink detection signal is output from the first coupler, the first downlink detection signal is reflected by the first reflector and input to the first coupler, and input to the fifth coupling apparatus through the first filter, and the first downlink test signal passes through the fifth coupling apparatus, and then the first uplink detection loopback signal is output from the second coupling apparatus and fed into the uplink trunk line; and after the first uplink detection signal is output from the fourth coupler, the first uplink detection signal is reflected by the fourth reflector and input to the fourth coupler, and input to the fifth coupling apparatus through the fourth filter, and the first downlink test signal passes through the fifth coupling apparatus, and then the first uplink detection loopback signal is output from the second coupling apparatus and fed into the uplink trunk line.

17. The transport apparatus for detecting a submarine optical cable line according to claim 11, wherein: the first coupling apparatus comprises a first coupler and a first reflector, the second coupling apparatus comprises a second coupler and a second reflector, the third coupling apparatus comprises a third coupler and a third reflector, and the fourth coupling apparatus comprises a fourth coupler and a fourth reflector;

the transport apparatus further comprises a first filter connected to the first coupling apparatus and the fifth coupling apparatus, a second filter connected to the second coupling apparatus and the fifth coupling apparatus, a third filter connected to the third coupling apparatus and the fifth coupling apparatus, and a fourth filter connected to the fourth coupling apparatus and the fifth coupling apparatus;

the first downlink detection signal passes through the first coupler, is input to the fifth coupling apparatus through the first filter, and passes through the fifth coupling apparatus, and then the first downlink detection loopback signal is output from the third coupler and fed into the uplink trunk line;

the second downlink detection signal is reflected by the second reflector and input to the second coupler, and input to the fifth coupling apparatus through the second filter, and passes through the fifth coupling apparatus, and then the second downlink detection loopback signal is output from the third coupler and fed into the uplink trunk line;

backscattered light generated in the downlink trunk line, namely, a third downlink detection signal, reversely passes through the second coupler, is fed into the fifth coupling apparatus through the second filter, passes through the fourth filter, reversely passes through the fourth coupler, passes through the fourth coupler again after being reflected by the fourth reflector, and is input to the third coupler after being coupled and input to the second optical functional unit, and a third downlink detection loopback signal is output from the third coupler and fed into the uplink trunk line;

the first uplink detection signal passes through the fourth coupler, is input to the fifth coupling apparatus through the fourth filter, and passes through the fifth coupling apparatus, and then the first uplink detection loopback signal is output from the second coupler and fed into the downlink trunk line;

the second uplink detection signal is reflected by the third reflector and input to the third coupler, and input to the fifth coupling apparatus through the third filter, and passes through the fifth coupling apparatus, and then the second uplink detection loopback signal is output from the second coupler and fed into the downlink trunk line; and backscattered light generated in the uplink trunk line, namely, a third uplink detection signal, reversely passes through the third coupler, is fed into the fifth coupling apparatus through the third filter, passes through the first filter, reversely passes through the first coupler, passes through the first coupler again after being reflected by the first reflector, and is input to the second coupler after being coupled and input to the first optical functional unit, and a third uplink detection loopback signal is output from the second coupler and fed into the downlink trunk line.

18. The transport apparatus for detecting a submarine optical cable line according to claim 11, wherein: the first coupling apparatus, the second coupling apparatus, the third coupling apparatus, and the fourth coupling apparatus are all couplers in a 1×2 structure; and the fifth coupling apparatus is a coupler in an asymmetric 2×2 structure.

* * * * *